US007108171B1

(12) United States Patent
Ergo et al.

(10) Patent No.: US 7,108,171 B1
(45) Date of Patent: *Sep. 19, 2006

(54) METHODS OF TEMPORARILY PROVIDING DIGITAL CONTENT TO A CUSTOMER

(76) Inventors: Michael Jared Ergo, 12009 Coit Rd. #1301, Dallas, TX (US) 75251; Rachel Pauline Avery, 12009 Coit Rd. #1301, Dallas, TX (US) 75251

(*) Notice: Subject to any disclaimer, the term of this patent is extended or adjusted under 35 U.S.C. 154(b) by 293 days.

This patent is subject to a terminal disclaimer.

(21) Appl. No.: 10/688,739

(22) Filed: Oct. 17, 2003

Related U.S. Application Data

(63) Continuation-in-part of application No. 10/664,558, filed on Sep. 17, 2003, which is a continuation of application No. 10/188,455, filed on Jul. 2, 2002, now Pat. No. 6,655,580.

(51) Int. Cl.
G06F 17/00 (2006.01)
(52) U.S. Cl. .................. 235/375; 235/381; 705/51; 705/57
(58) Field of Classification Search ............... 235/375, 235/381, 383, 449; 705/57, 51; 700/234, 700/235, 237
See application file for complete search history.

(56) References Cited

U.S. PATENT DOCUMENTS

| 4,528,643 | A | 7/1985 | Freeny, Jr. |
| 4,794,560 | A | 12/1988 | Bell et al. |
| 5,028,766 | A | 7/1991 | Shah |
| 5,088,586 | A | 2/1992 | Isobe et al. |
| 5,130,792 | A | 7/1992 | Tindell et al. |
| 5,247,347 | A | 9/1993 | Litteral et al. |
| 5,348,841 | A | 9/1994 | Tao et al. |
| 5,445,295 | A | 8/1995 | Brown |
| 5,523,551 | A | * | 6/1996 | Scott ..................... 235/381 |
| 5,633,839 | A | 5/1997 | Alexander et al. |
| 5,794,217 | A | 8/1998 | Allen |
| 6,011,772 | A | 1/2000 | Rollhaus et al. |
| 6,173,267 | B1 | 1/2001 | Cairns |
| 6,330,490 | B1 | 12/2001 | Kim et al. |
| 6,338,933 | B1 | 1/2002 | Lawandy et al. |
| 6,343,063 | B1 | 1/2002 | Rollhaus et al. |

(Continued)

OTHER PUBLICATIONS

"Spectra Systems Corp-SpectraDisc Corp" [on-line] [Retrieved On: Apr. 17, 2002] retrieved from: http://www.spectradisc.com/ p. 1-2.

(Continued)

Primary Examiner—Thien M. Le
Assistant Examiner—Edwyn Labaze
(74) Attorney, Agent, or Firm—Barry W. Dove; Barry Dove Patent Services, Inc.

(57) ABSTRACT

There are methods of temporarily providing digital content to a customer based on a request for a desired digital content. At a point of sale, a writeable optically-readable medium may be provided with a changeable portion that, when activated, is adapted to physically change over a period of time (e.g., 3–5 days) to a degree that at least part of the medium becomes unreadable by an optical media reading machine. The desired digital content is preferably written on the medium at a point of sale based on the request. The written medium is provided to the customer. The customer pick up the medium at the point of sale, or the medium may be delivered to the customer, for example. The customer preferably need not return the medium because it will become unreadable after a period of time upon activating the changeable portion.

85 Claims, 16 Drawing Sheets

U.S. PATENT DOCUMENTS

| | | |
|---|---|---|
| 6,511,728 B1 | 1/2003 | Bakos et al. |
| 6,537,635 B1 | 3/2003 | Bakos et al. |
| 6,780,564 B1 * | 8/2004 | Lawandy et al. ......... 430/270.1 |
| 6,950,941 B1 * | 9/2005 | Lee et al. .................... 713/193 |
| 6,958,180 B1 * | 10/2005 | Hibino et al. ............... 428/64.1 |
| 2002/0074398 A1 | 6/2002 | Lancos et al. |
| 2003/0135467 A1 * | 7/2003 | Okamoto ..................... 705/52 |
| 2005/0049931 A1 * | 3/2005 | Wisnudel et al. ............. 705/26 |

OTHER PUBLICATIONS

"Spectra Systems Corp-SpectraDisc Corp" [on-line] [Retrieved On: May 7, 2002] retrieved from: http://www.spectradisc.com/; p. 1 of 2.

* cited by examiner

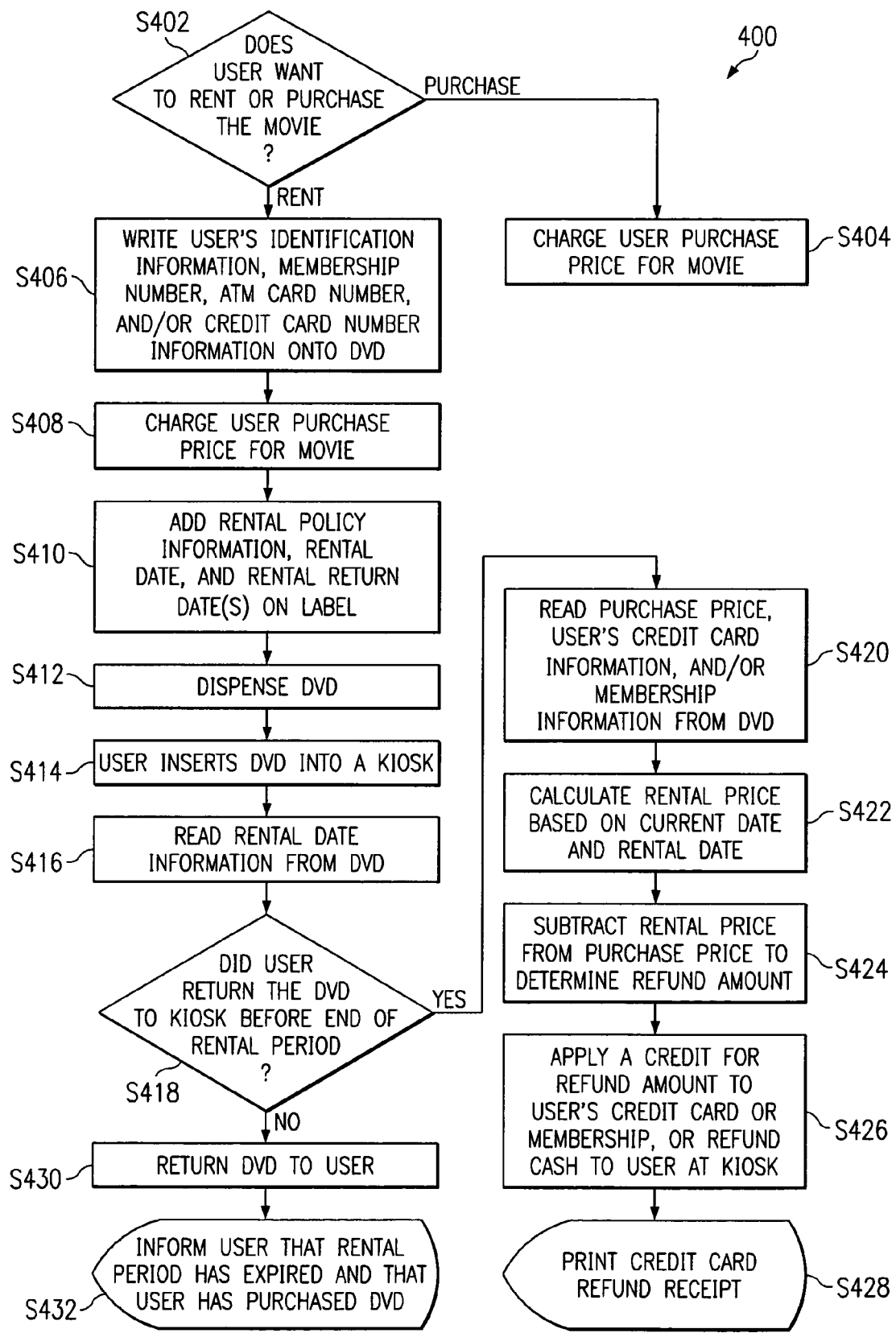

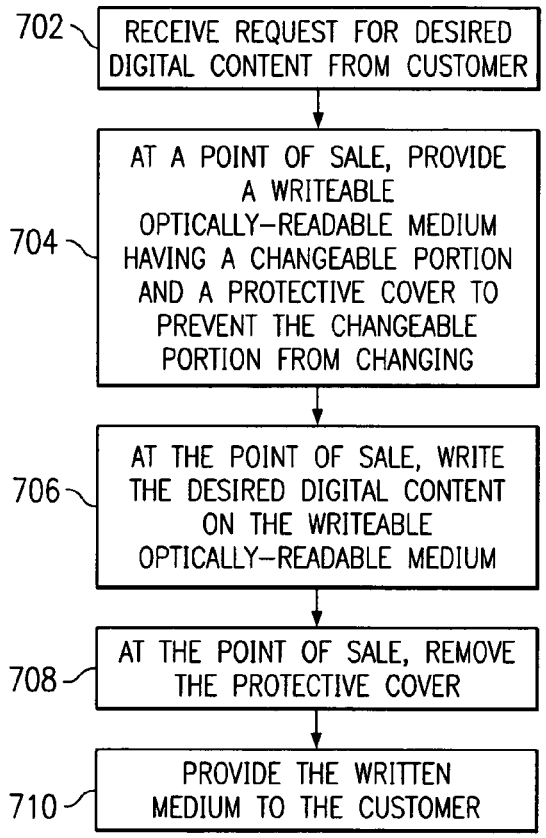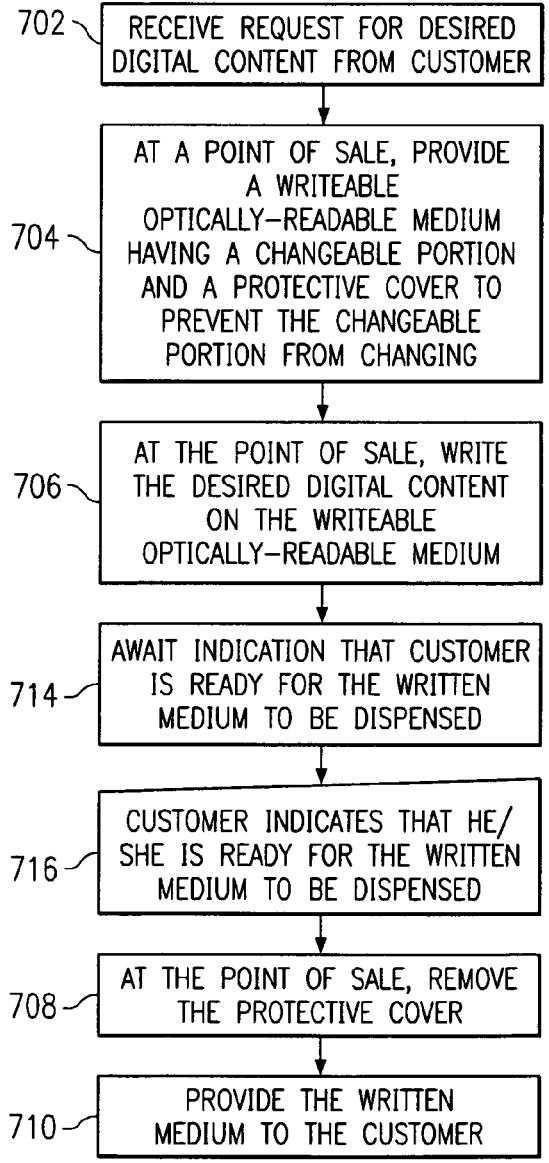

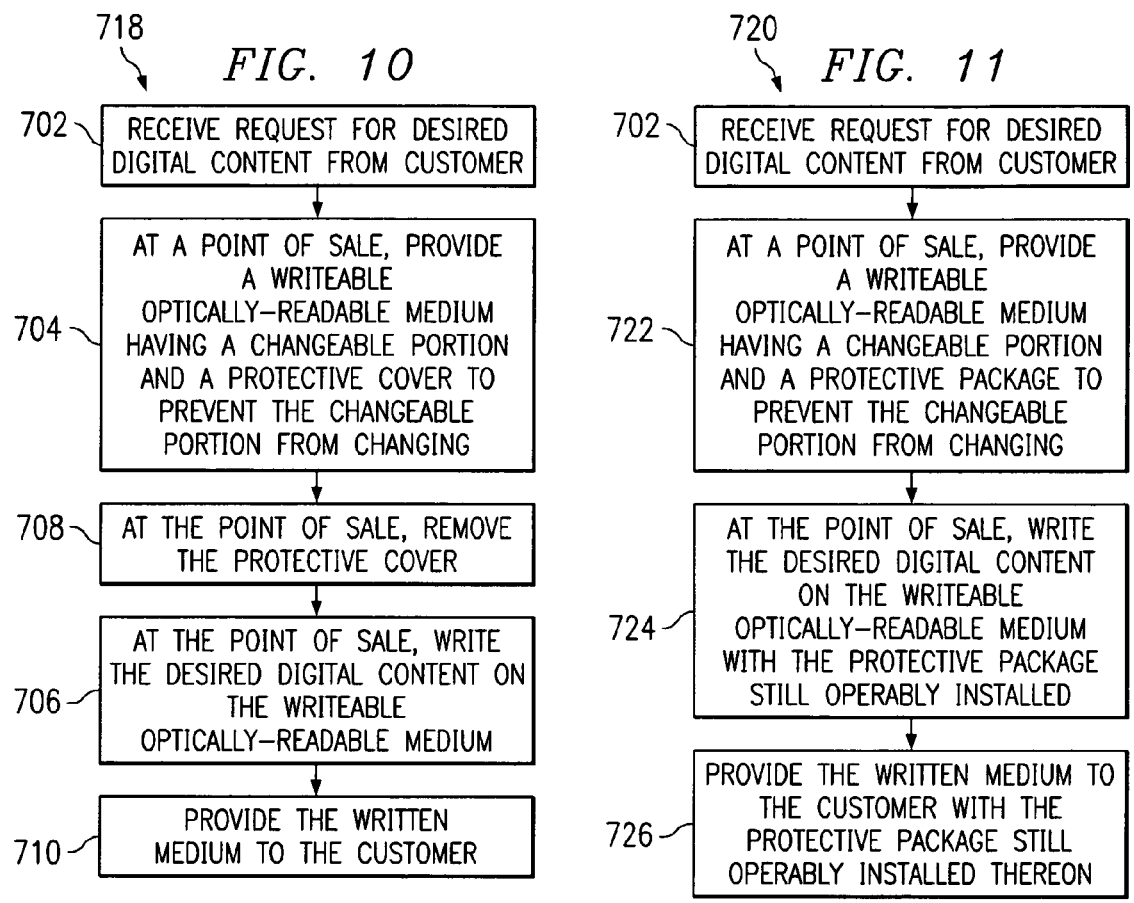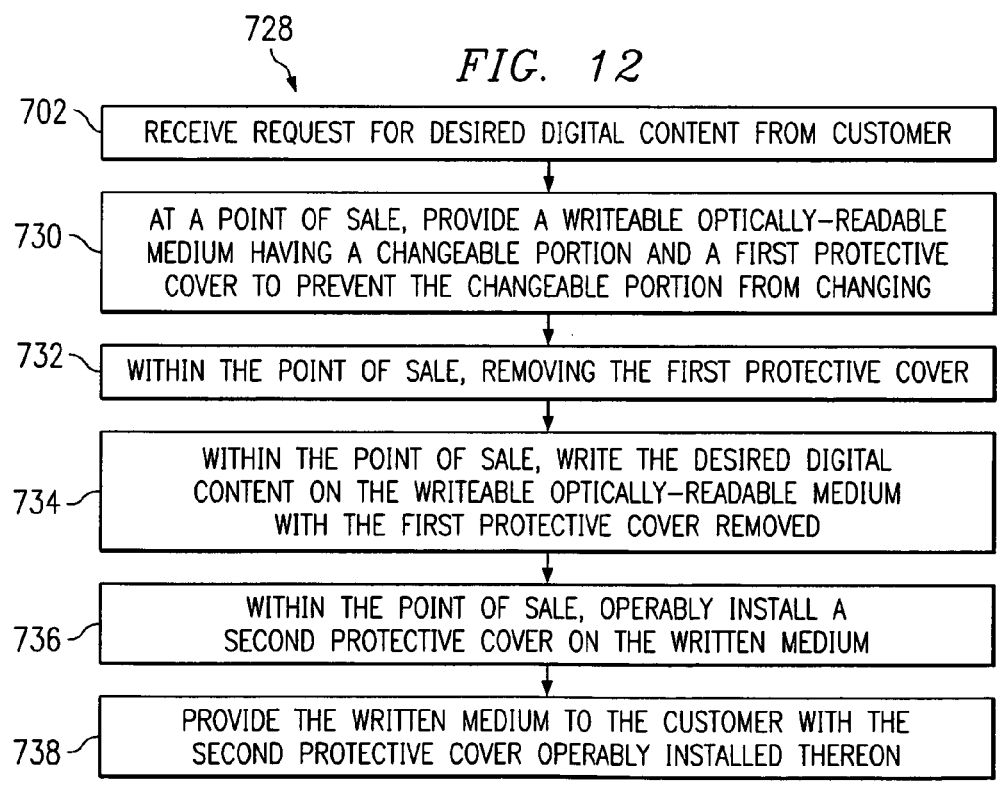

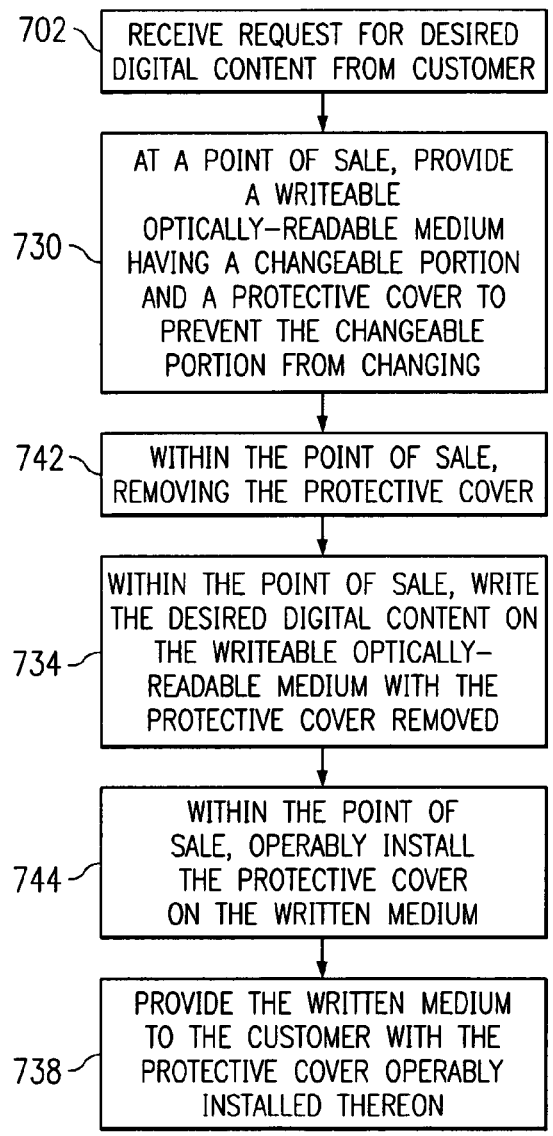
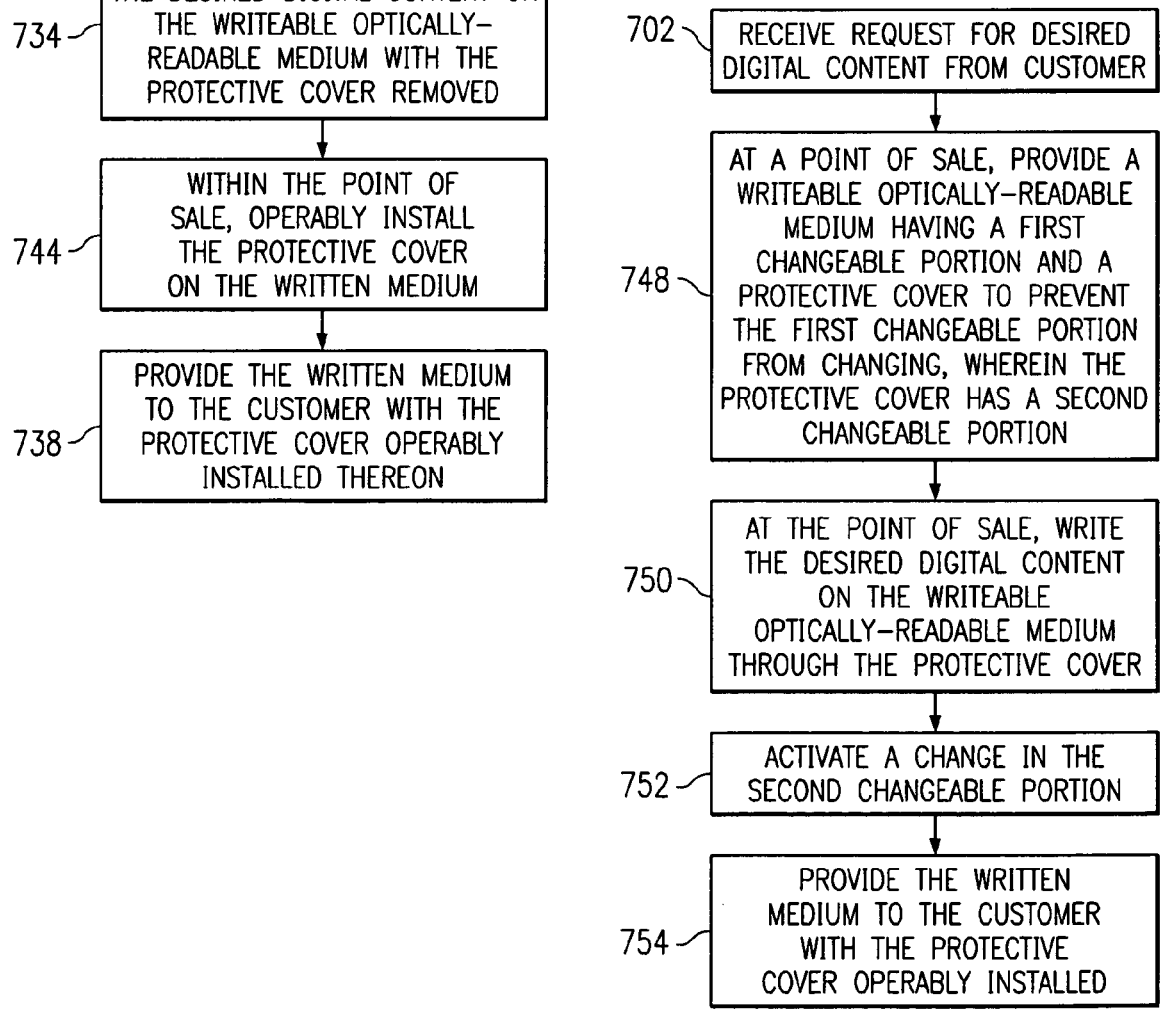

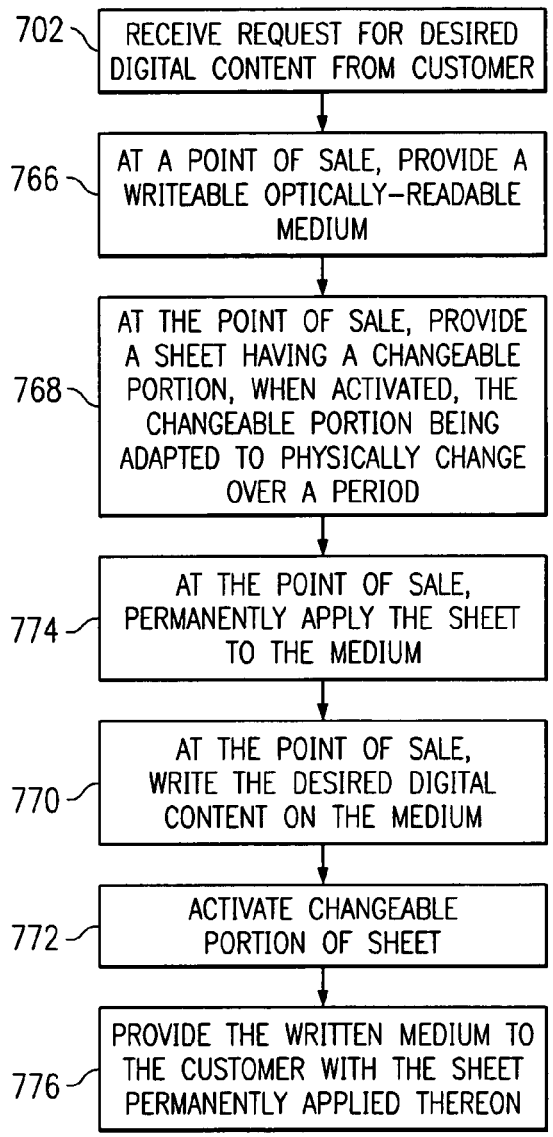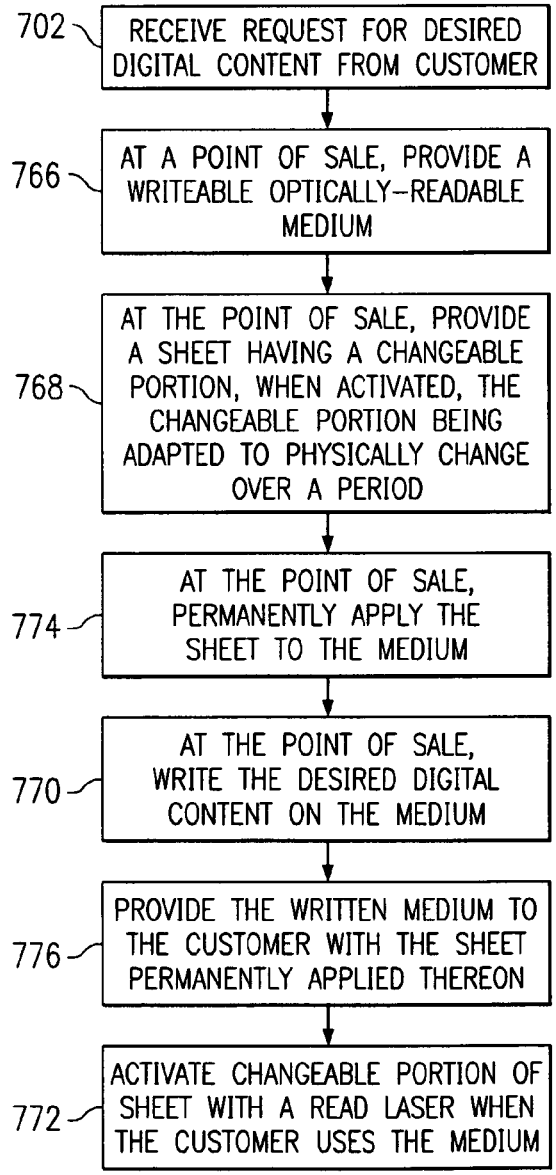

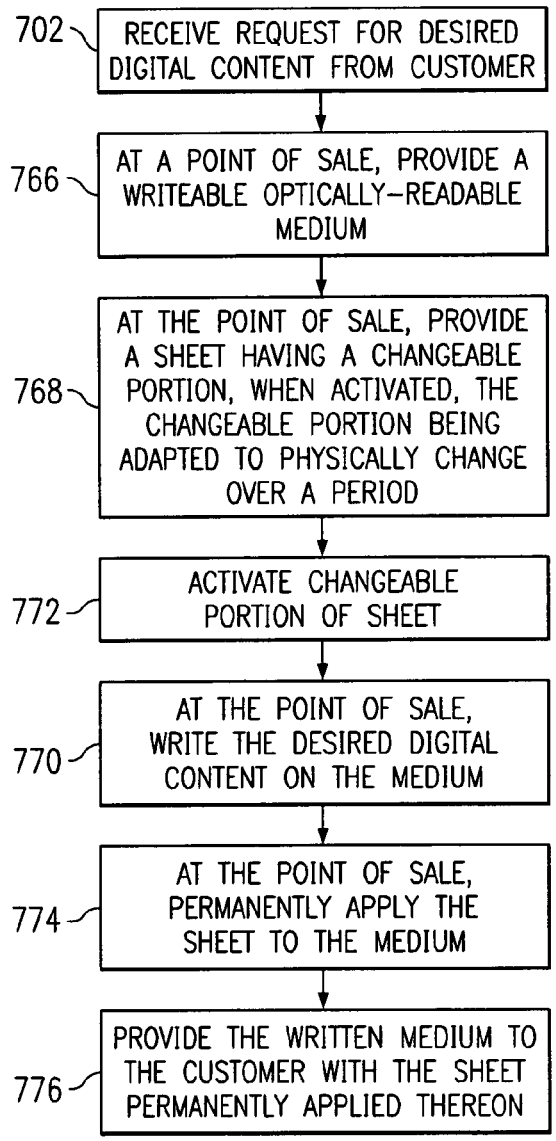
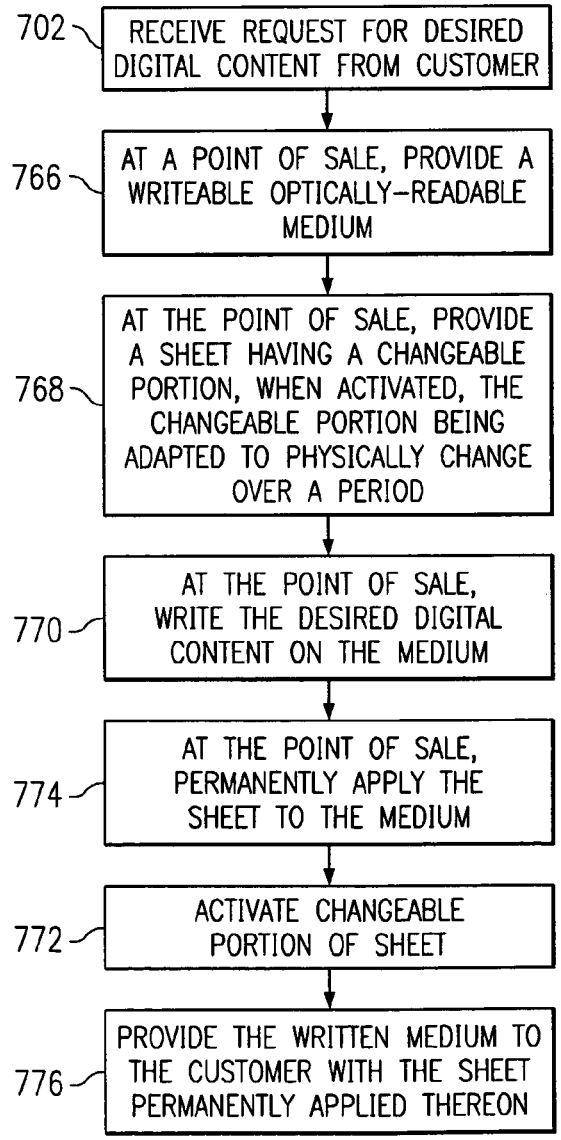

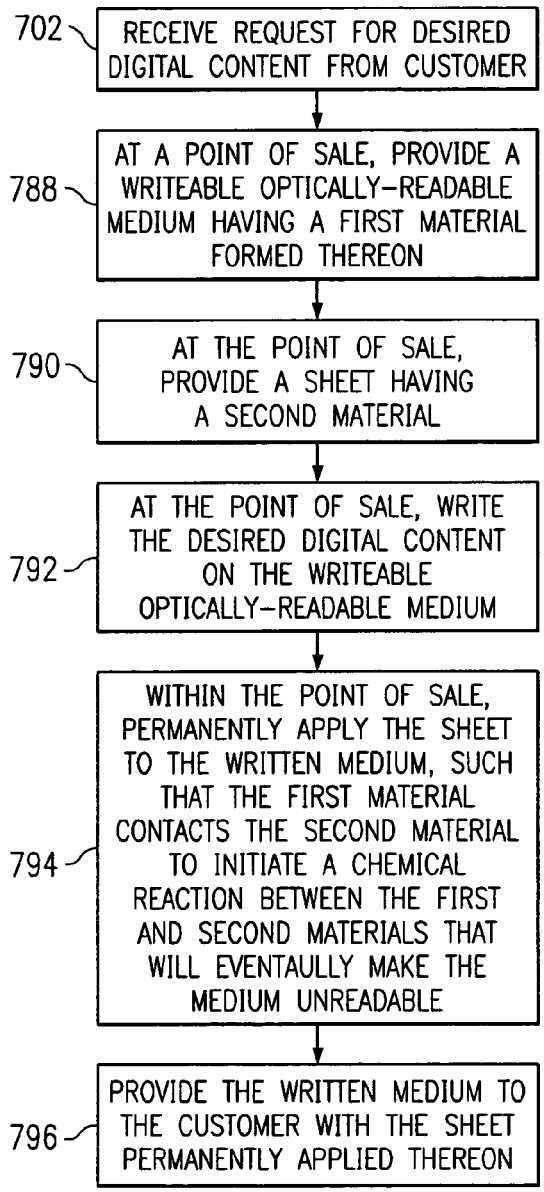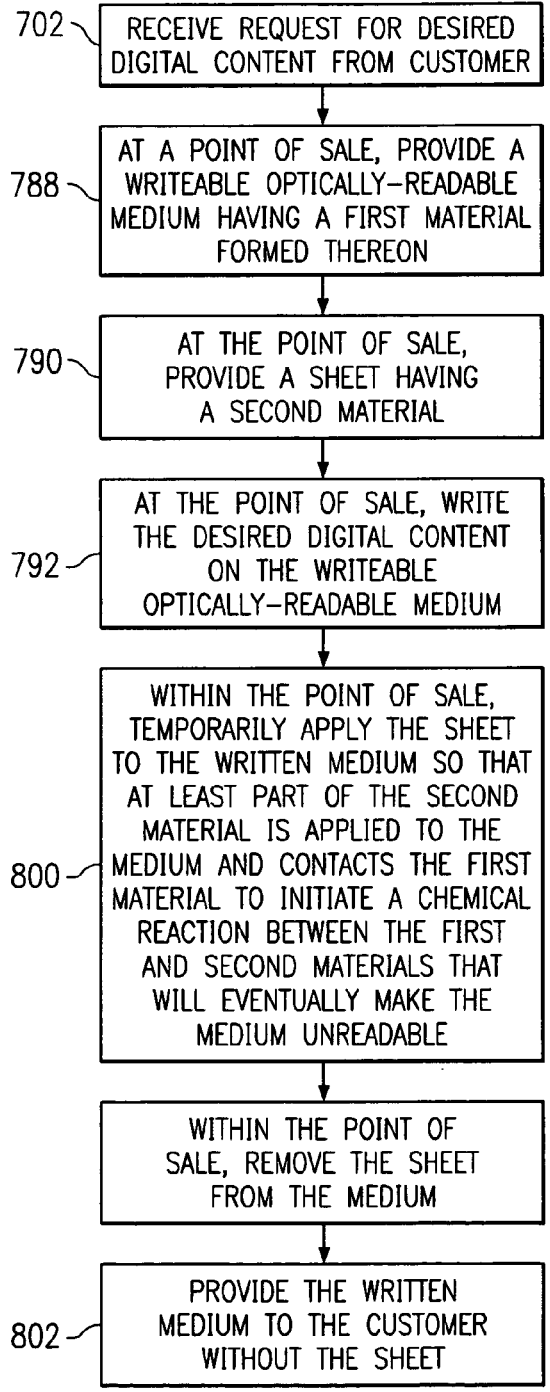

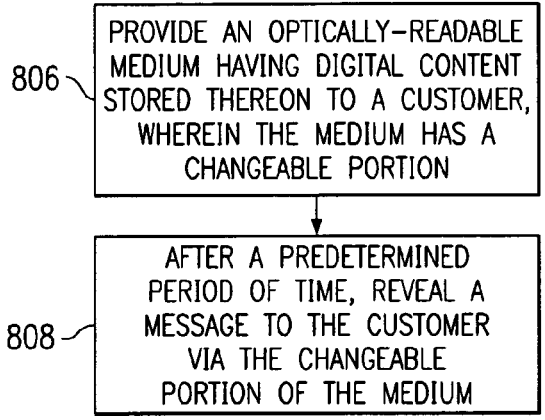
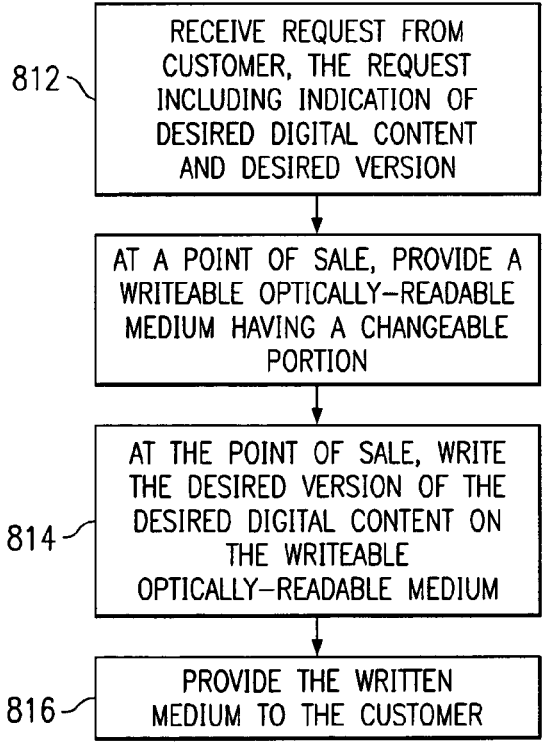
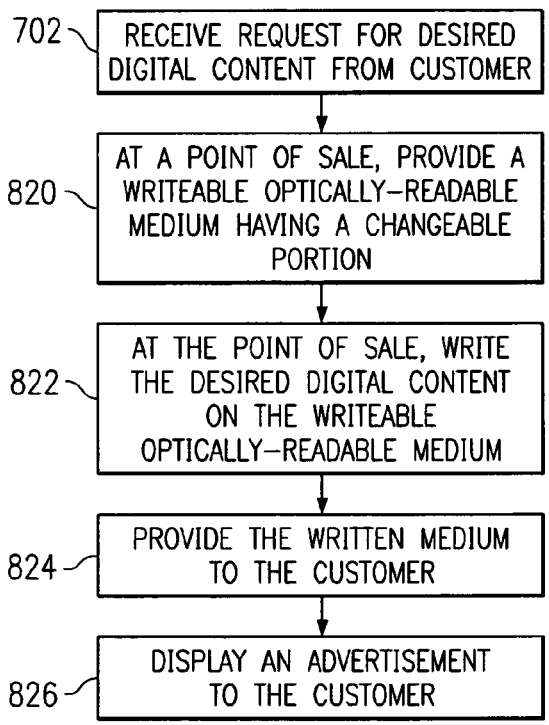

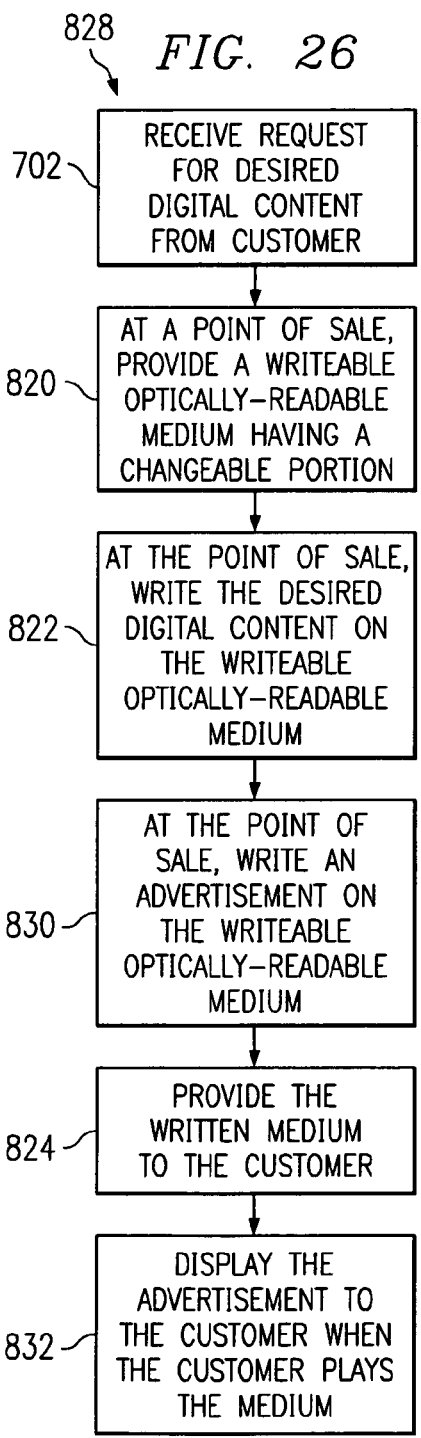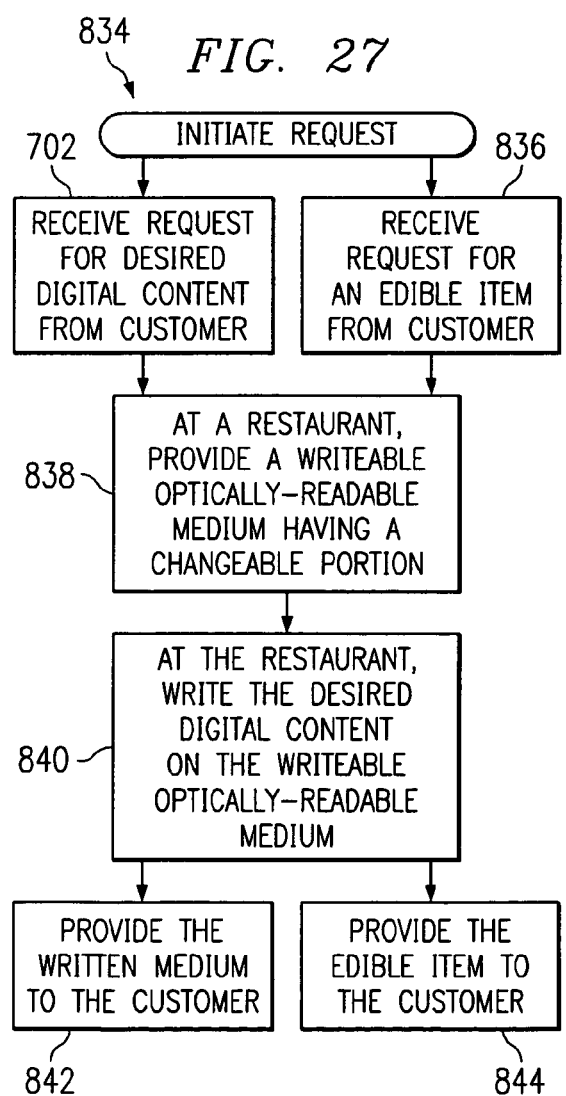

METHODS OF TEMPORARILY PROVIDING DIGITAL CONTENT TO A CUSTOMER

This application is a continuation-in-part of patent application Ser. No. 10/664,558, entitled "System and Method for Renting or Purchasing Digital Media," filed on Sep. 17, 2003, which is a continuation of patent application Ser. No. 10/188,455, entitled "System and Method for Renting or Purchasing Digital Media," filed on Jul. 2, 2002 now U.S. Pat. No. 6,655,580, which applications are incorporated herein by reference.

TECHNICAL FIELD

The present invention generally relates to temporarily providing digital content to a customer on an optically-readable medium. In one example use, the present invention relates to a method of renting a video to a customer on an optically-readable disc, which becomes unreadable after a period of time (e.g., 3 days) so that the customer need not return the rented video.

BACKGROUND

Upon entering a video rental store, one is faced with selecting one of perhaps several hundred video titles that the video rental store has available. Unfortunately, if one is looking for an older video or one that did not receive wide circulation, one will almost certainly not find the video available. Furthermore, even if one desired a recently released video that received wide circulation, one could readily discover that all copies of the video have already been rented.

Alternatively, if one desired to purchase a video, one again faces the possibility that the desired video is either out of stock, is no longer available, or the store does not have as many copies as one desired to purchase. In many cases, one may desire renting a video prior to purchasing it. This is not readily feasible in most rental stores. Even when a video store is found that allows both rental and purchase, the rental price will almost certainly not be applied toward the purchase price of the video.

Due to the physical size required for an inventory of several thousand video titles, the number of locations available to a video rental store is necessarily limited. The cost of an inventory that includes several thousand video titles also limits the number of video rental stores.

Additional disadvantages of renting videos include the fact that the video itself must be physically returned to the video rental store. If one does not return a rented video on time, one is usually faced with late charges. While purchasing a video allows one to watch at will, a rented video must be viewed within a very limited time period, typically 2–5 days.

Privacy and security issues are also relevant with video rentals. Typically one must be registered with a video rental store prior to renting a video. This registration may require disclosure of personal information that some may feel uncomfortable releasing. This registration also allows the video rental store to track an individual's rentals, which may be undesirable. Frequently the registration requires credit card information to guarantee return of the rented video. Increasingly, individuals are becoming leery of providing credit card information due to potential credit card fraud or abuse.

SUMMARY OF THE INVENTION

The problems and needs outlined above may be addressed by embodiments of the present invention. Embodiments of the present invention may allow one to select any one of a large archive of video (or audio, gaming or software) titles for rent and/or purchase.

In a first embodiment, the present invention provides a kiosk machine that will allow customers to browse a movie database, view movie descriptions, and then have a copy of the movie saved to a DVD disk that will become unreadable within a predetermined time, e.g., 48 hours. The purchased disk will be able to be viewed on most home DVD players (e.g., conventional DVD players).

As an example, the machine may be a free standing machine, located in stores that are open 24 hours a day, food delivery stores, apartment communities, etc. The machine may work just like an ATM, for example. The customer may use the touch screen to locate a movie title they would like to rent. The database may also allow the buyer to see clips of the film. Once the movie is found, the customer may be permitted to select a payment method, and then the customer pays. The kiosk may retrieve the movie data from the home based server, for example. In such case, the server sends the data, then the digital content is written onto the disk. The disk may be then placed in a plastic sleeve, for example, and dispensed. In most cases, the buyer will not have to return the movie, because the data will be unable to be read after a period of time (e.g., 48 hours).

It is envisioned that the machine will be accessible 24 hours a day and would enable a selection of movies that is larger than conventional movie rental stores. As an example, a pizza delivery shop may have a simplified model of the machine allowing the customer to order a pizza and their movie of choice available for delivery. This system could enable convenient sales, without late fees, memberships, credit cards or employees.

Aspects of the invention may be implemented in a number of ways. For example, a method for renting a video on an optically-readable medium after receiving a request for the video to be rented may be provided. At a point of sale, the video content may be written on the optically-readable medium. The optically-readable medium may be subsequently treated with an opaquing layer designed to render the optically-readable medium unreadable after a period of time. The rented video on the optically-readable medium then may be provided to a customer at the point of sale.

In accordance with a second embodiment of the present invention, an apparatus allowing a customer to either purchase or rent a video on an optically-readable medium is disclosed. The apparatus comprises a housing (e.g., kiosk) in which the remaining elements are mounted. The remaining elements may include means for receiving a request for the video and means for receiving payment information. Further elements within the housing may be means for writing video content on the optically-readable medium, means for writing sales information on the optically-readable medium and means for providing the video on the optically-readable medium to the customer, for example.

In accordance with a third embodiment of the present invention, a method of allowing a customer to either purchase or rent entertainment content on an optically-readable medium is disclosed. The method may comprise receiving both a request for the entertainment content and payment information. Entertainment content then may be written on the optically-readable medium at a point of sale. Time and date information also may be written on the optically-readable medium and then the entertainment content on the optically-readable medium is provided to the customer. Upon the customer returning the optically-readable medium to the point of sale, the customer is provided with a partial payment credit, for example.

Some embodiments of the present invention allow customers to rent a DVD from a machine utilizing both point of sale and remote databases of movies and a point of sale DVD writer. The DVD writer preferably utilizes technology that is much faster than a DVD writer ordinarily available in the consumer market currently. The machine may allow customers to browse, preview, and rent DVD videos 24 hours a day. Because the DVD "self-destructs" and can be disposed of after being viewed, it gives the customer the advantage of no late fees and no return trips to drop off the movie. Having video content in both point of sale and remote databases allows the customer to choose from thousands of videos almost instantly. Because the video content may be stored in databases, an unlimited number of copies of each video may be rented.

Because the machine may be completely automated and unmanned, it will likely save the operating company employee costs, as compared to a conventional movie rental store. Because the machine may be quite small, when compared to a video rental store, it will likely save the operating company rental space and upkeep costs. The operating company may also save money in operating costs such as electricity, security, etc. The operating company may also have the advantage of getting customers that a video rental store would not get due to the limited open hours, and the limited titles and quantity of movies on hand at the video rental store.

Another advantage for the operating company as well as the customer is that the business model may be structure so that no membership is required. This is advantageous for the one time buyer who does not have an established membership (e.g., an out-of-town visitor at a local hotel), as well as younger customers who have money but do not have credit cards to receive a membership. The operating company profits in both of these examples because they are receiving business that the video rental store normally would not receive.

Because the machine is relatively small and relatively portable, it may be placed in many locations. Street corners, 24-hour convenience stores, apartment complexes, pizza places, and restaurants are just a few possible machine locations, for example.

The machine may also make gift cards. These cards, similar to credit cards, could be bought and given as gifts to be redeemed at the machine, for example. The gift cards may be used in the machine's credit card reader, for example. The gift card may either be for a specific dollar amount or for a specific number of rentals, for example. Restrictions also may be put on the cards as well, such as allowing only certain ratings of movies to be rented.

A further advantage of an embodiment of the present invention is that a customer may rent a video, and if the customer desires to keep the video, the customer may do so. The customer may thus preview a video before deciding to purchase it. If the customer does not wish to purchase the video, the customer may return the video on the optically-readable medium and receive a partial credit. These and other advantages should become more apparent with the benefit of this disclosure.

In accordance with another aspect of the present invention, a method of temporarily providing digital content to a customer, is provided. This method includes the following steps, the order of which may vary. A request is received from the customer. The request includes an indication of a desired digital content. At a point of sale, a writeable optically-readable medium is provided having a removable protective cover operably installed thereon. The medium includes a changeable portion that, when activated, is adapted to physically change over a period of time to a degree that at least part of the medium becomes unreadable by an optical media reading machine. The protective cover is adapted to inhibit activation of the changeable portion of the medium when operably installed. At the point of sale, the desired digital content is written on the medium. At the point of sale, the protective cover is removed to activate the changeable portion. The written medium is provided to the customer without the protective cover. The protective cover may be a layer, and a majority of the layer may have a substantially uniform thickness, for example. The protective cover may remain operably installed during the writing. The protective layer may be removed before the writing. The request may further include a location choice for the point of sale. The protective layer may be removed as the written medium is being provided to the customer. The protective layer may be removed before the written medium is provided to the customer. The method may further include receiving an indication that the customer is ready for the written medium to be dispensed, wherein the protective layer is removed from the written medium after the receipt of the indication that the customer is ready. The digital content may be video, audio, text, images, web pages, hyperlinked text, a movie, a music video, an interactive video, a game, a television show, a television series, a cartoon, computer software, a still advertisement, an advertisement banner, a commercial, a movie preview, a public service announcement, an educational film, a document, sales information, or combinations thereof, for example. The protective cover may completely enclose the medium, or cover at least part of the medium, for example. The point of sale may be a kiosk. The point of sale may be at a location, such as: an unmanned-stand-alone building, a convenience store, a restaurant, a video rental store, a gas station, a grocery store, a pizza delivery shop, a shopping mall, a shopping center, a booth, a parking lot, an apartment building, a laundry facility, a dormitory, a school campus, a library, a book store, a music store, a metro station, a bus station, an airport, a hotel, an exercise facility, a fitness club, an arena, a convention center, or combinations thereof, for example. The providing of the written medium to the customer may be performed at the point of sale by dispensing the written medium to the customer. Alternatively, the providing of the written medium to the customer may be performed by delivering the written medium to the customer, for example.

In accordance with yet another aspect of the present invention, a method of temporarily providing digital content to a customer, is provided. This method includes the following steps, the order of which may vary. A request is received from the customer. The request includes an indication of a desired digital content. At a point of sale, a writeable optically-readable medium having a removable protective cover operably installed thereon is provided. The medium includes a changeable portion that, when activated, is adapted to physically change over a period of time to a degree that at least part of the medium becomes unreadable by an optical media reading machine. The protective cover is adapted to inhibit activation of the changeable portion of the medium when operably installed. At the point of sale, the protective cover is removed to activate the changeable portion. At the point of sale and after removing the protective cover, the desired digital content is written on the medium. The written medium is provided to the customer without the protective cover.

In accordance with still another aspect of the present invention, a method of temporarily providing digital content to a customer, is provided. This method includes the following steps, the order of which may vary. A request is received from the customer. The request includes an indication of a desired digital content. At a point of sale, a writeable optically-readable medium having a removable protective cover operably installed thereon is provided. The medium includes a first changeable portion that, when activated, is adapted to physically change over a period of time to a degree that at least part of the medium becomes unreadable by an optical media reading machine. The protective cover is adapted to inhibit activation of the first changeable portion of the medium when operably installed and wherein the protective cover includes a second changeable portion that, when activated, is adapted to physically change over a period of time to a degree that at least part of the medium is unreadable through the protective cover by an optical media reading machine. At the point of sale, the desired digital content is written on the medium and through the protective cover while the protective cover is operably installed on the medium. The second changeable portion of the protective cover is activated such that at least part of the protective cover must be removed before subsequently reading the medium with an optical media reading machine. The written medium is provided to the customer with the protective cover operably installed on the medium. At the point of sale, the writeable optically-readable medium having a protective package operably installed may be provided, wherein the protective package is adapted to inhibit activation of the second changeable portion of the protective cover when operably installed, and at the point of sale, the protective package may be removed before the writing. The second changeable portion may be activated during the writing by a laser used for the writing.

In accordance with another aspect of the present invention, a method of temporarily providing digital content to a customer, is provided. This method includes the following steps, the order of which may vary. A request is received from the customer. The request includes an indication of a desired digital content. At a point of sale, a writeable optically-readable medium having a protective package operably installed thereon is provided. The medium includes a changeable portion that, when activated, is adapted to physically change over a period of time to a degree that at least part of the medium becomes unreadable by an optical media reading machine. The protective package is adapted to inhibit activation of the changeable portion of the medium when operably installed. At the point of sale, the desired digital content is written on the medium with the protective package operably installed thereon. The written medium is provided to the customer with the protective package operably installed thereon. The writing of the desired digital content may be performed by a specialized machine adapted to retain the medium and write to the medium while the protective package is still operably installed, and the protective package, when operably installed, may obstruct normal use of the medium in a common optical media reading machine such that the protective package must be at least partially removed before the customer may read the medium with a common optical media reading machine, for example.

In accordance with yet another aspect of the present invention, a method of temporarily providing digital content to a customer, is provided. This method includes the following steps, the order of which may vary. A request is received from the customer. The request includes an indication of a desired digital content. At a point of sale, a writeable optically-readable medium having a first removable protective cover operably installed thereon is provided. The medium includes a changeable portion that, when activated, is adapted to physically change over a period of time to a degree that at least part of the medium becomes unreadable by an optical media reading machine. The first protective cover is adapted to inhibit activation of the changeable portion of the medium when operably installed. At the point of sale, removing the first protective cover from the medium. At the point of sale and with the first protective cover removed, the desired digital content is written on the medium. At the point of sale and after the writing, a second removable protective cover is operably installed on the written medium. The second protective cover is adapted to inhibit activation of the changeable portion of the medium when operably installed. The written medium is provided to the customer with the second protective cover operably installed thereon. The removing of the first protective cover, the writing, and the operably installing the second protective cover may be performed in a controlled environment. The controlled environment in such case may be a vacuum chamber, a low pressure chamber, a chamber lacking humidity, a chamber including an inert gas, a chamber lacking an ingredient or gas that would activate the changeable portion, or combinations thereof, for example. The first protective cover may cover only a portion of the medium. The first protective cover may entirely enclose the medium therein. The second protective cover may cover only a portion of the medium. The second protective cover may entirely enclose the medium therein. The second protective cover may be the first protective cover.

In accordance with still another aspect of the present invention, a method of temporarily providing digital content to a customer, is provided. This method includes the following steps, the order of which may vary. A request is received from the customer. The request includes an indication of a desired digital content. At a point of sale, a writeable optically-readable medium is provided. At the point of sale, a sheet is also provided. The sheet is separate from the medium and the sheet includes a changeable portion that, when activated, is adapted to physically change over a period of time. At the point of sale, the desired digital content is written on the medium. At the point of sale, the sheet is permanently applied to the medium. The changeable portion of the sheet is activated so that after the period of time the changeable portion of the sheet is physically changed to a degree that at least part of the medium becomes unreadable through the sheet by an optical media reading machine. The written medium is provided to the customer. The activating of the changeable portion may be performed before the writing of the desired digital content on the medium and before the applying of the sheet to the medium. In such case, the writing of the desired digital content on the medium may be performed before or after the applying of the sheet to the medium. The writing of the desired digital content on the medium may be performed before the activating of the changeable portion and before the applying of the sheet to the medium. In such case, the applying of the sheet to the medium may be performed before or after the activating of the changeable portion. The applying of the sheet to the medium may be performed before the writing of the desired digital content on the medium and before the activating of the changeable portion. In such case, the activating of the changeable portion may be performed before, during, and/or after the writing of the desired digital content on the medium. The activating of the changeable portion may occur at the point of sale, or may be initiated by a read laser when the customer uses the medium.

In accordance with a further aspect of the present invention, a method of temporarily providing digital content to a customer, is provided. This method includes the following steps, the order of which may vary. A request is received from the customer. The request includes an indication of a desired digital content. At a point of sale, a writeable optically-readable medium is provided. At the point of sale, a sheet is also provided. The sheet is separate from the medium. The sheet includes a changeable portion that, when activated, is adapted to physically change over a period of time, and a removable protective cover operably installed thereon. The protective cover is adapted to inhibit activation of the changeable portion when operably installed. At the point of sale, the desired digital content is written on the medium. At the point of sale, the protective cover is removed from the sheet to activate the changeable portion. At the point of sale, the sheet is permanently applied to the written medium. After the period of time, the changeable portion of the sheet is physically changed to a degree that at least part of the medium becomes unreadable through the sheet by an optical media reading machine. The written medium is provided to the customer.

In accordance with another aspect of the present invention, a method of temporarily providing digital content to a customer, is provided. This method includes the following steps, the order of which may vary. A request is received from the customer. The request includes an indication of a desired digital content. At a point of sale, a writeable optically-readable medium is provided. The medium has a first material formed on a read-side surface thereof. At the point of sale, the desired digital content is written on the medium. At the point of sale, a sheet is also provided. The sheet is separate from the medium and the sheet includes a second material. At the point of sale, the sheet is permanently applied to the read-side of the written medium, such that at least part of the first material is in contact with at least part of the second material. The first and second materials react with each other and after a period of time at least part of the medium becomes unreadable by an optical media reading machine through an area where the first and second materials are in contact. The written medium is provided to the customer. The sheet may be made from the second material, and/or the sheet may have the second material formed thereon. The sheet may be initially covered at least partially by a protective cover, and the method may further include removing the protective cover from the sheet at the point of sale and before the permanently applying. The first material and/or second material may include an adhesive. An adhesive may be formed when the first material reacts with the second material.

In accordance with another aspect of the present invention, a method of temporarily providing digital content to a customer, is provided. This method includes the following steps, the order of which may vary. A request is received from the customer. The request includes an indication of a desired digital content. At a point of sale, a writeable optically-readable medium is provided. The medium has a first material formed thereon. At the point of sale, the desired digital content is written on the medium. At the point of sale, a sheet is also provided. The sheet is separate from the medium and wherein the sheet comprises a second material. At the point of sale, the sheet is temporarily applied to the written medium, such that at least part of the first material is in contact with at least part of the second material. The first and second materials react with each other so that after a period of time at least part of the medium becomes unreadable by an optical media reading machine. At the point of sale, the sheet is removed from the medium. The written medium is provided to the customer. The first material may be located on a read side of the medium. The first material may be located on a non-read side of the medium, and the sheet may be temporarily applied to the non-read side of the medium. The combination of first and second materials may need time to dry on the medium before dispensing the medium to the customer. The combination of the first and second materials may need to be cured before the dispensing the medium to the customer. Such curing may include, for example, exposing the combination of the first and second materials to electromagnetic waves selected from a group consisting of ultraviolet light, infrared light, radio waves, microwaves, or combinations thereof.

In accordance with still another aspect of the present invention, a method of temporarily providing digital content to a customer and conducting a contest, is provided. This method includes the following steps, the order of which may vary. A request is received from the customer. The request includes an indication of a desired digital content. An optically-readable medium having digital content stored thereon is provided to the customer. The medium includes a changeable portion adapted to change from a non-read-inhibiting state to a read-inhibiting state over a predetermined period of time so that at least part of the medium becomes unreadable by an optical media reading machine due to the changeable portion after the predetermined period of time. At least part of the changeable portion forms a message relating to whether the customer has won a prize in the contest. After the predetermined period of time, the message is revealed to the customer by becoming visible to the customer. The message itself may provide an indication to the customer that the customer has won a prize in the contest. The message may include a code, so that the customer may go to a web site and enter the code at the web site to determine whether the customer has won a prize in the contest. The changeable portion may be substantially transparent in the non-read-inhibiting state, and the changeable portion may be colored and non-transparent in the read-inhibiting state. The changeable portion may be substantially non-light-absorbent in the non-read-inhibiting state, and the changeable portion may be colored and light-absorbent in the read-inhibiting state. The changeable portion may be substantially transparent in the non-read-inhibiting state, and the changeable portion in the read-inhibiting state may include a property of being opaque, translucent, colored, cloudy, crazed, light-absorbing, light-scattering, light-distorting, light-diffusing, phase-inverting, or combinations thereof, for example. The digital content may be written on the medium at the point of sale, wherein the medium is a writeable optically-readable medium.

In accordance with yet another aspect of the present invention, a method of temporarily providing digital content to a customer and providing a message to the customer, is provided. This method includes the following steps, the order of which may vary. An optically-readable medium having digital content stored thereon is provided to the customer. The medium includes a changeable portion adapted to change from a non-read-inhibiting state to a read-inhibiting state over a predetermined period of time so that at least part of the medium becomes unreadable by an optical media reading machine due to the changeable portion after the predetermined period of time. At least part of the changeable portion forms a message. After the predetermined period of time, the message is revealed to the customer by becoming visible to the customer. The message may provide an indication to the customer that the customer has won a prize in a contest. The message may include a code, so that the customer may go to a web site and enter the code at the web site to determine whether the customer has won a prize. The message may provide a coupon and/or an advertisement. The message may include a logo. The message may include a statement, such as "thank you," "disc expired," "please recycle," "please rent again with us," "rent again," or combinations thereof, for example. The changeable portion may be substantially transparent in the non-read-inhibiting state. The changeable portion in the read-inhibiting state may include a property of being opaque, translucent, colored, cloudy, crazed, light-absorbing, light-scattering, light-distorting, light-diffusing, phase-inverting, or combinations thereof, for example. The digital content may be written on the medium at the point of sale, wherein the medium is a writeable optically-readable medium.

In accordance with a further aspect of the present invention, a method of temporarily providing digital content to a customer from a restaurant, is provided. This method includes the following steps, the order of which may vary. A first request is received from the customer including an indication of a desired digital content. A second request is received from the customer including an order for an edible item. At the restaurant, a writeable optically-readable medium is provided. The medium includes a changeable portion that, when activated, is adapted to physically change over a period of time to a degree that at least part of the medium becomes unreadable by an optical media reading machine. At the restaurant, the desired digital content is written on the medium. The medium is provided to the customer with the desired digital content written thereon. The edible item is provided to the customer. The providing of the medium to the customer and the providing of the edible item to the customer may be performed together or separately. The providing of the medium to the customer and the providing of the edible item to the customer may be performed together by delivering the medium and the edible item to the customer. The providing of the medium to the customer and/or the providing of the edible item to the customer may be performed at the restaurant. The receipt of the first request from the customer may be performed at the restaurant. The receipt of the second request from the customer may be performed at the restaurant. The receipt of the first request and/or the receipt of the second request from the customer may be performed at a web site. The receipt of the first and second requests from the customer may be performed together, or separately. The edible item may be beer, soda, juice, water, ice, pizza, hamburger, french fries, rice, noodles, egg roll, soup, salad, taco, burrito, seafood, fish, chicken, beef, pork, processed soy product, dessert, pastry, donuts, cake, vegetable, fruit, or combinations thereof, for example.

In accordance with another aspect of the present invention, a method of temporarily providing digital content to a customer and providing an advertisement to the customer, is provided. This method includes the following steps, the order of which may vary. A request is received from the customer including an indication of a desired digital content. At a point of sale, a writeable optically-readable medium is provided. The medium includes a changeable portion that, when activated, is adapted to physically change over a period of time to a degree that at least part of the medium becomes unreadable by an optical media reading machine. At the point of sale, the desired digital content is written on the medium. The medium with the desired digital content written thereon is provided to the customer. The advertisement is displayed to the customer. The displaying of the advertisement to the customer may be performed at the point of sale. The advertisement may be displayed on a screen of a kiosk, wherein the kiosk is the point of sale. The advertisement may be displayed on a screen adjacent to a kiosk, wherein the kiosk is the point of sale, and wherein the screen is communicably coupled to a component within the kiosk. The advertisement may include a still image attached to an outside of a kiosk, wherein the kiosk is the point of sale. The advertisement may be for a business having a location within a same city as the point of sale. The advertisement may be for something such as a movie, a television show, a television station, a radio station, a music band, a music compilation, an artist, an entertainer, a restaurant, an event, real estate, a real estate agent, a play, a game, a sports team, a food, a drink, a travel agency, a vacation destination, a city, a state, a country, a religious organization, an educational organization, a non-profit organization, an announcement, a product, a service, a web site, or combinations thereof, for example. The advertisement may be digitally written on the medium along with the desired content, wherein the displaying of the advertisement to the customer may be performed via an optical media reading machine. The advertisement may include a video. The video may include content such as text, images, web pages, hyperlinked text, audio, music, a movie preview, information about a product, information about a service, information about real estate, information about a business having a location with a same city as the point of sale, information about a vacation destination, educational information, music, a public service announcement, information about a religion, or combinations thereof, for example.

In accordance with another aspect of the present invention, a method of temporarily providing digital content to a customer, is provided. This method includes the following steps, the order of which may vary. A request is received from the customer including an indication of a desired digital content and an indication of a desired version of the desired digital content. At a point of sale, a writeable optically-readable medium is provided. The medium includes a changeable portion that, when activated, is adapted to physically change over a period of time to a degree that at least part of the medium becomes unreadable by an optical media reading machine. At the point of sale, the desired version of the desired digital content is written on the medium. The medium with the desired version of the desired digital content written thereon is provided to the customer. The desired version may specify something such as full screen video format, wide screen video format, sound output format, language selection, originally released version, digitally remastered version, uncut version, director's cut version, unabridged version, special edition, including-bonus-material version, including-deleted-scenes version, edited-for-television version, subtitle language selection, rated G version, rated PG version, rated PG-13 version, rated R version, unrated version, extended version, revised version, or combinations thereof, for example. The desired digital content may be a computer game, computer software, an educational tutorial, web pages, music, music videos, or combinations thereof, for example. In such cases, the desired version may specify something selected from a group consisting of a game console selection, a computer operating system selection, compatibility with another software program, an education level, a religious viewpoint, a music recording format, a video display format, or combinations thereof, for example.

In accordance with still another aspect of the present invention, a method of temporarily providing digital content to a customer, is provided. This method includes the following steps, the order of which may vary. A request is received from the customer including an indication of a desired digital content and an indication of a first location choice for a point of sale. A wait time required to fulfill the request at the first location choice is estimated. The customer is informed about the estimated wait time at the first location choice. The customer is asked if the estimated wait time at the first location choice is acceptable. If the customer indicates that the estimated wait time at the first location choice is not acceptable, a wait time required to fulfill the request at an alternative location for the point of sale is estimated. If the estimated wait time at the alternative location is less than the estimated wait time at the first location choice, the customer is informed about the estimated wait time at the alternative location and if the customer still desires that the request be fulfilled, a current location choice for the point of sale is obtained. If the customer indicates that the estimated wait time at the first location choice is acceptable, the first location choice is made the current location choice for the point of sale. At the point of sale of the current location choice, a writeable optically-readable medium is provided. The medium includes a changeable portion that, when activated, is adapted to physically change over a period of time to a degree that at least part of the medium becomes unreadable by an optical media reading machine. At the point of sale of the current location choice, the desired digital content is written on the medium. At the point of sale of the current location choice, the medium with the desired digital content written thereon is provided to the customer.

BRIEF DESCRIPTION OF THE DRAWINGS

The following is a brief description of the drawings, which show illustrative embodiments of the present invention and in which:

FIG. 4 is a flowchart of a fourth embodiment of the present invention;

FIGS. 8–24 are flowcharts illustrating fifth through twenty-first embodiments, respectively, of the present invention;

FIGS. 25 and 26 are flowcharts illustrating variations of a twenty-second embodiment of the present invention; and FIG. 27 is a flowchart illustrating a twenty-third embodiment of the present invention.

DETAILED DESCRIPTION OF ILLUSTRATIVE EMBODIMENTS

Figure 1:
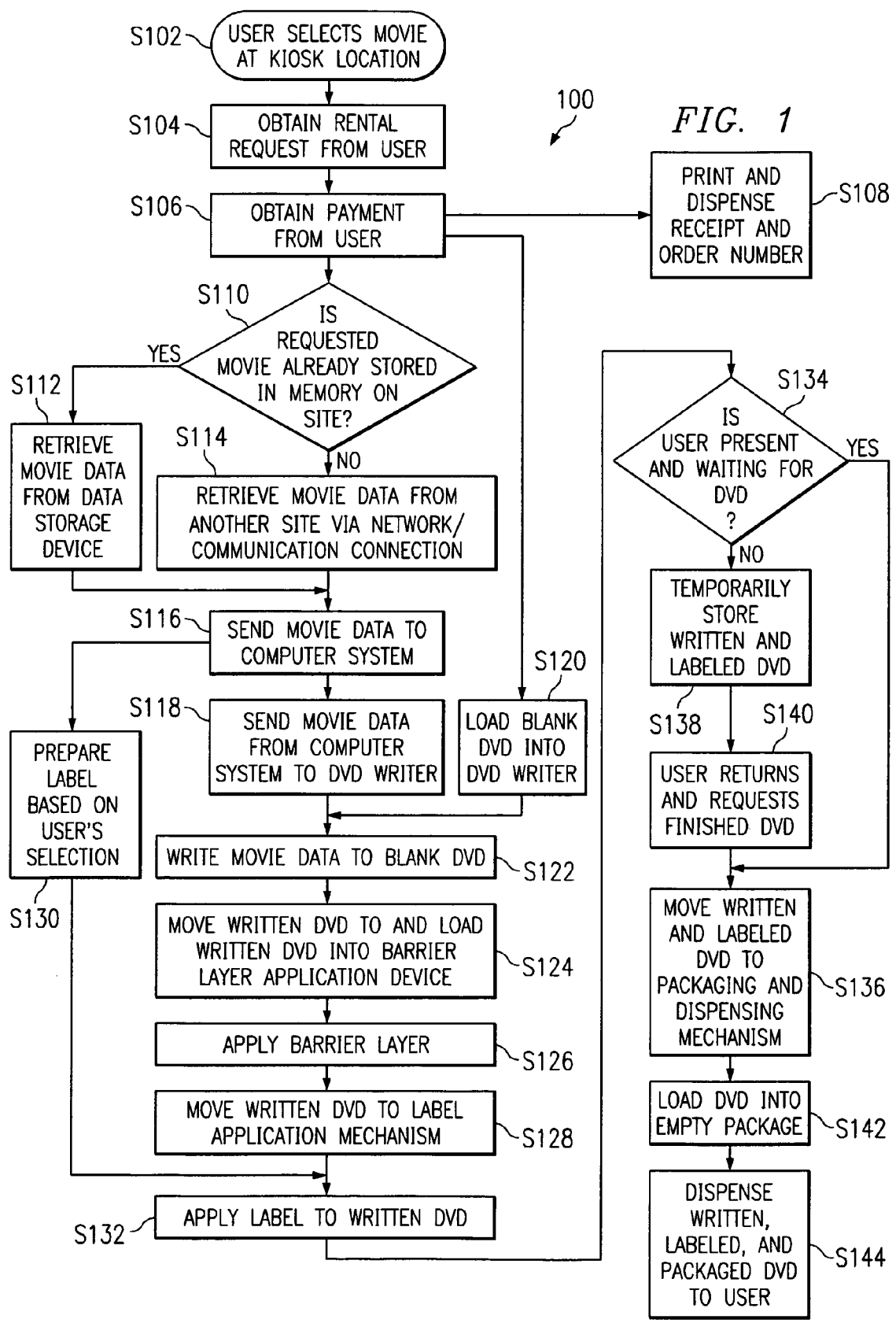
FIG. 1 is a flowchart of a first embodiment of the present invention.

Referring now to the drawings, wherein like reference numbers are used herein to designate like elements throughout the various views, illustrative embodiments of the present invention are shown and described. The figures are not necessarily drawn to scale, and in some instances the drawings have been exaggerated and/or simplified in places for illustrative purposes only. One of ordinary skill in the art will appreciate the many possible applications and variations of the present invention based on the following illustrative embodiments of the present invention.

Some embodiments of the present invention are be described with respect to a specific context, namely a kiosk for renting or purchasing videos on an optically-readable medium, preferably a digital versatile disc (DVD). An embodiment also may be applied, however, to audio information (e.g., a music CD) or software (including games for game consoles), for example.

In most embodiments, a kiosk is provided to prepare and sell digital media to customers at the point of sale. In one example, the kiosk is equipped with an apparatus to coat DVDs (or other media) after they are written. The coating is designed to make the disk unreadable after a given time thereby eliminating the need for the consumer to return the disk (as with a rental) and also eliminating many of the copyright concerns of the content provider.

In one embodiment, the ordering process may be performed remotely, e.g., over the Internet or a telephone line. This provides additional convenience to the consumer by allowing the medium to be prepared before the time of purchase or before the customer arrives to pick up the medium. It also allows the system to better control the operation and availability of content (e.g., a movie will not be removed from local cache if it will be needed shortly).

In yet another embodiment, the barrier layer may be eliminated by writing rental information (e.g., date and time of sale) on a portion of the medium. This embodiment may provide for a simpler kiosk apparatus but also requires that the medium to be returned in the case of rentals.

These and other embodiments will be described in greater detail below. While described as individual embodiments, it should be clear that various aspects of different flow charts or other parts of the embodiments may be combined and/or modified. The particular embodiments described are intended to be descriptions of broad concepts rather than specific limitations.

FIG. 1 provides the process flow 100 for a first embodiment of the present invention. In step S102, the customer selects a rental video using a kiosk (such as kiosk 500 of FIG. 5, which is discussed below). A computer system receives the rental video request from the customer in step S104. The computer system then requests and obtains payment from the customer in step S106 and prints a receipt in step S108.

The computer system determines if the video content corresponding to the selected rental video is stored on a local video content server in step S110. If the video content is stored on the local video content server, the video content is retrieved from the local video content server in step S112 and sent to the computer system in step S116. If the video content is not stored on the local video content server, it is requested from a remote video content server via a network/communication connection in step S114. The video content retrieved from the remote video content server is then sent to the computer system in step S116.

Once the computer system has received the video content, it is sent to a DVD writer in step S118. A DVD transporter retrieves a blank DVD from a blank DVD storage unit and places it in the DVD writer in step S120. The DVD writer then writes the video content on the blank DVD in step S122. The DVD transporter then transfers the written DVD to an opaquing layer application device in step S124 and an opaquing layer is applied to the DVD in step S126. The DVD transporter then moves the written DVD to a label applicator in step S128. The computer system causes an appropriate label to be prepared by a label printer in step S130 and a label applicator applies the label in step S132.

The kiosk then determines if the customer is present and waiting for the completed DVD in step S134. If the customer is present, the DVD transporter places the completed DVD in a DVD dispenser in step S136. If the customer is not present, the DVD transporter places the completed DVD in a temporary storage unit in step S138. Upon a later indication that the customer is now present as determined in step S140, the DVD transporter retrieves the completed DVD from the temporary storage unit and places it in the DVD dispenser in step S136. An empty package from an empty package storage unit is then placed upon the completed DVD in step S142. The packaged completed DVD is then dispensed to the customer in step S144.

As noted above, the customer may not be present when the DVD is completed. This may be due to several factors. As writing the DVD is not instantaneous, the kiosk may be placed in a grocery store, mall or convenience store. The customer may then proceed with grocery shopping, etc., and return to the kiosk when the grocery shopping is completed and receive the completed DVD at that time. Alternatively, instead of placing the video rental order at the kiosk itself, the customer may place the video rental order over the Internet or over a phone line via a series of prompts. In either of these cases, the customer must then go to the kiosk to receive the completed DVD.

Figure 2:
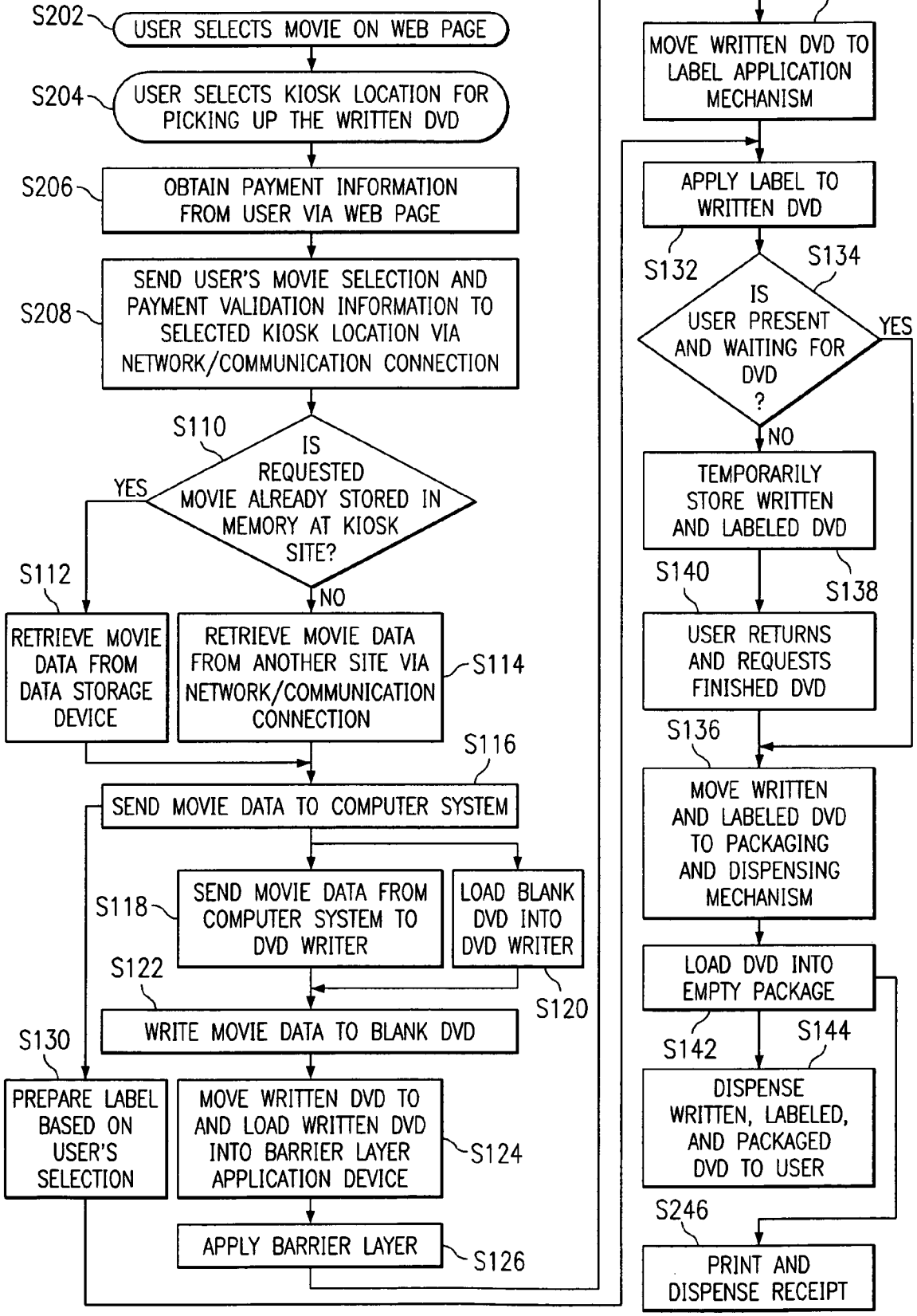
FIG. 2 is a flowchart of a second embodiment of the present invention.

In a second embodiment, whose process 200 is shown in FIG. 2, the customer places the video rental order remotely. For example, the order can be placed over the Internet or via a telephone (e.g., wireless or landline). An Internet version will be discussed but the steps apply equally to other remote access techniques. As many of the steps involved in this second embodiment are the same as those in the first embodiment, like steps are denoted by like numbers and may not be described further.

In process 200, the customer selects the rental video using an interactive website over the Internet in step S202. As part of this process 200, the user also selects a kiosk location for receiving the completed DVD in step S204 (if more than one kiosk location is available). Lastly, the customer enters payment information using the interactive website in step S206 and in return receives a confirmation number and/or an agreed upon password. Once this information has been entered, the network/communication connection transfers it to the computer system at the selected kiosk in step S208. The remainder of process 200 is the same as process 100, with the exception that a receipt is printed and dispensed to the customer in step S246 (the customer may be permitted choose whether a receipt should be dispensed).

Figure 3A:
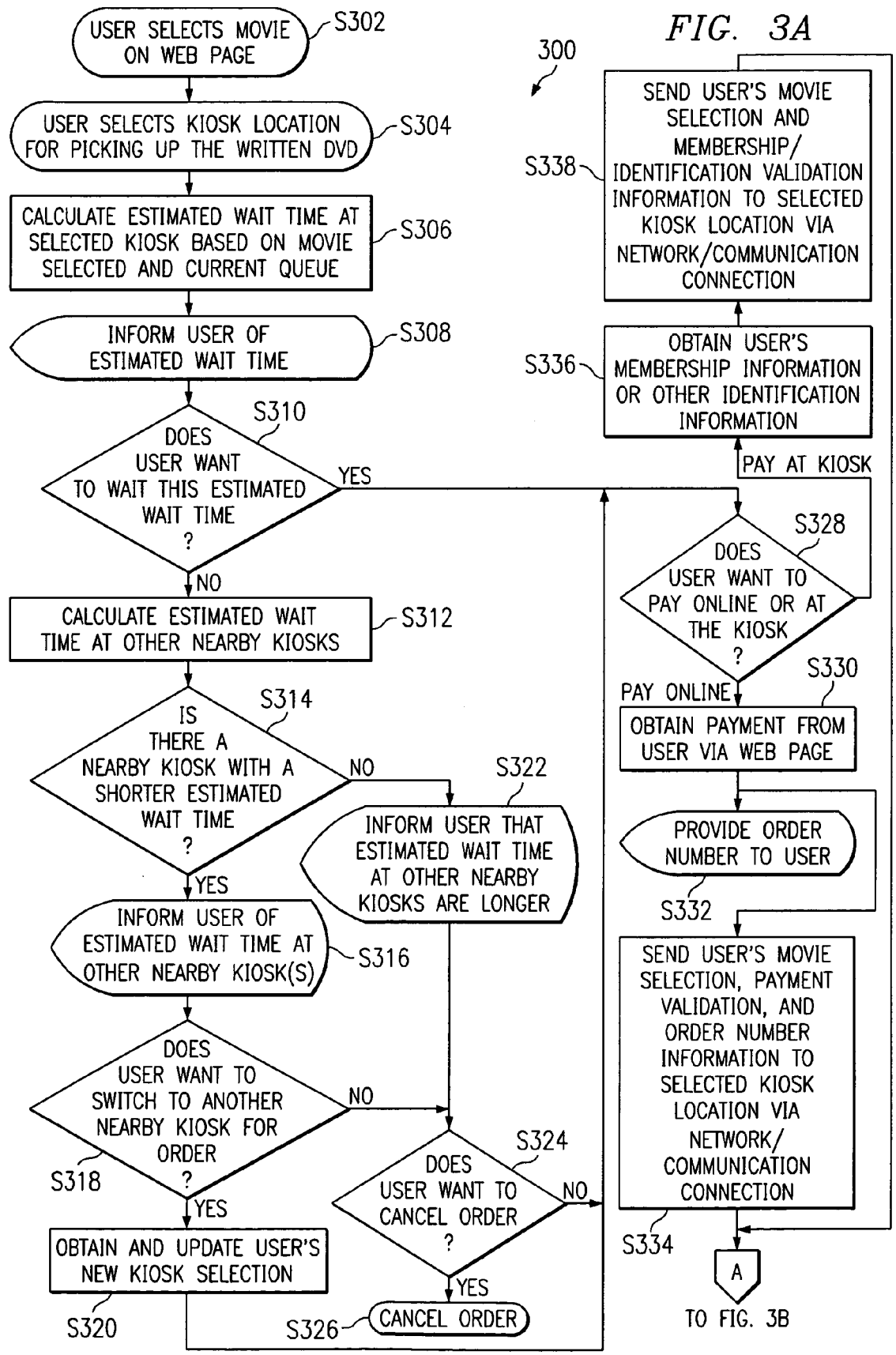
FIG. 3 is a flowchart of a third embodiment of the present invention.
Figure 3B:
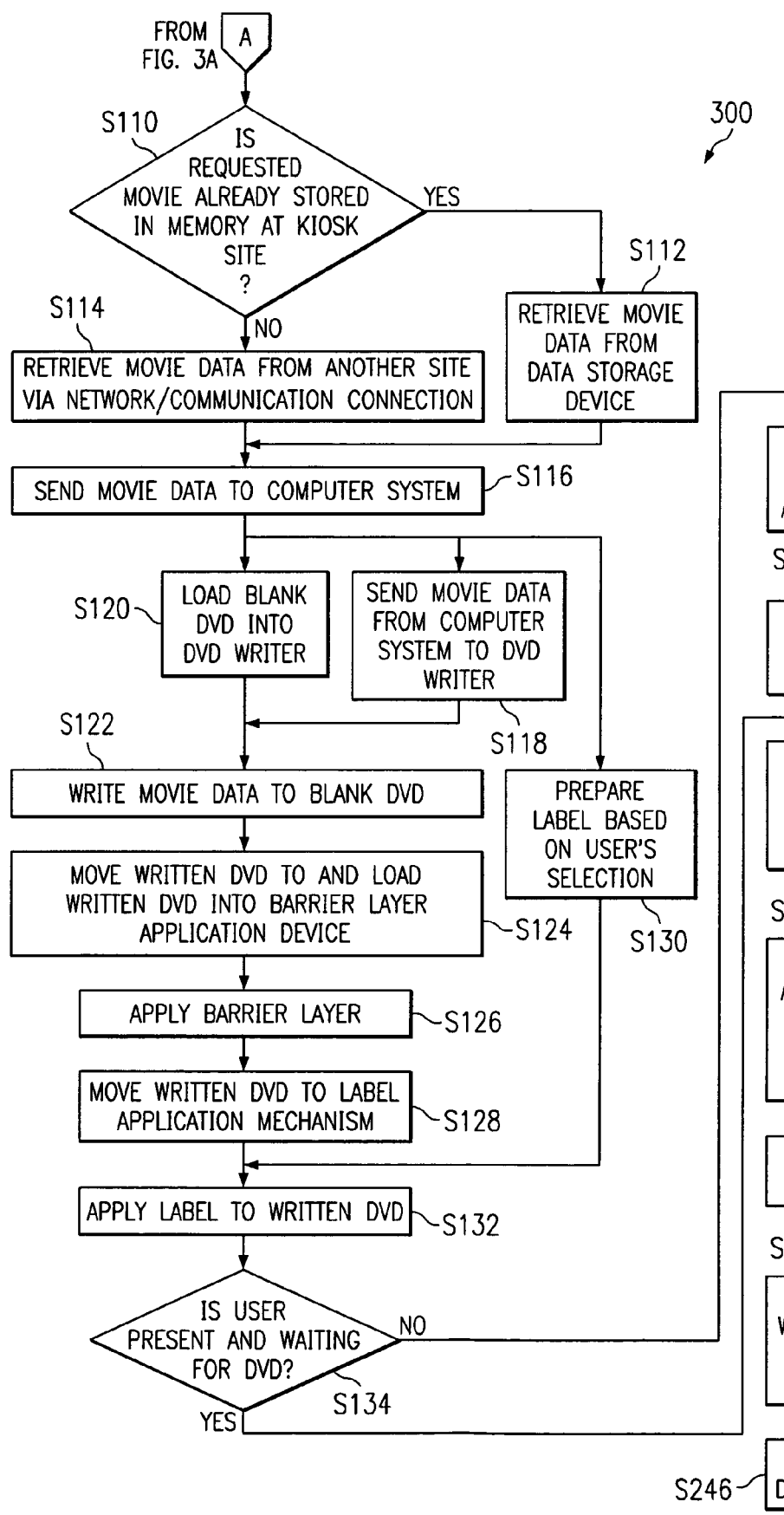

The process 300 shown in FIG. 3 is a third embodiment. Like the process 200, the process 300 has much in common with the process 100 and thus identical steps are numbered identically and will not be discussed further.

In the process 300, the customer selects the rental video using an interactive website over the Internet in step S302 and selects a preferred kiosk location for receiving the completed DVD in step S304. The website host (or another computer in the system) calculates an estimated wait time at the preferred kiosk in step S306 and informs the customer of the estimated wait time in step S308. The customer is then asked if this estimated wait time is too long in step S310. If the customer indicates the estimated wait time is too long, the website host calculates an estimated wait time at several nearby kiosks in step S312. The website host (or another computer in the system) then determines if one of the nearby kiosks has a shorter estimated wait time than the preferred kiosk in step S314. If at least one of the nearby kiosks has a shorter wait time than the preferred kiosk wait time, the website host informs the customer of the estimated wait time at the nearby kiosks in step S316. In step S318, the website gives the customer the option of changing preferred kiosks. If the customer desires to change preferred kiosks, the website obtains the new preferred kiosk selection in step S320.

If it is determined that there are no nearby kiosks with a shorter wait time, the website informs the customer that no shorter estimated wait times are available in step S322. In step S324, the website host gives the customer the option of canceling the rental order. If the customer indicates a desire to cancel the rental order, the rental order is cancelled in step S326. In step S318 if the customer indicated changing preferred kiosks was not acceptable, the customer is given the option to cancel the order in step S324.

If the original estimated wait time was acceptable, no kiosk locations had shorter estimated wait times, or the preferred kiosk was changed, the customer selects between paying over the Internet or at the preferred kiosk in step S328. If the customer elects to pay over the Internet, the process 300 receives the user's payment information, such as a credit card account number and/or credit card authorization information for example, in step S330. The website host then provides an order number and/or an agreed upon password, for example, to the customer in step S332. Some or all of the required information is then transmitted to the computer system at the preferred kiosk using the network/communication connection in step S334. If the customer elects to pay at the kiosk, the website host may obtain the customer's membership information or other validation information in step S336. All of the required information, including the membership or other validation information, may be transmitted to the computer system at the preferred kiosk in step S338. The completed DVD may be created in the same manner as in the process 100. Receiving the completed DVD is slightly different in the process 300 in that the customer either enters the order number provided in step S332, for example, or pays at the kiosk in step S335.

In a fourth embodiment, as shown by process 400 illustrated in FIG. 4, the customer is given the option of either renting or purchasing the written DVD. In step S402, the customer is queried whether the transaction will be a purchase or a rental. If the customer elects to purchase the DVD, the customer is charged the purchase price in step S404 and the DVD is written and dispensed as in the process 100, preferably without the DVD receiving the opaquing layer applied in steps S124 and S126.

If the customer elects to rent the DVD, the customer's membership information, validation information, rental time and date, and/or credit card information, for example, is written to the DVD in step S406. The customer is charged the video purchase price in step S408. The DVD is then written as in the process 100, with two possible exceptions. As with a purchased DVD, steps S124 and S126 are omitted, that is the opaquing layer is not applied to the DVD.

Furthermore, the label may include additional information such as rental policy, return date, etc, for example. The DVD is then dispensed in step S412.

The customer then returns to the kiosk after having watched the rented DVD and inserts the DVD into the DVD dispenser (or some other insertion device provided) in step S414. The computer system then reads the rental time from the DVD in step S416 and determines if the customer returned the rented DVD within the rental period in step S418. If the customer did return the DVD within the rental period, the computer system reads the customer's membership information, validation information, and/or credit card information from the DVD in step S420. The computer system calculates the rental price based upon the actual rental time in step S422. The computer system then subtracts the rental price from the purchase price in step S424 to determine a payment credit. The payment credit is then refunded to the customer's credit card, returned in cash to the customer at the kiosk via a change cup, or credited to an account of the customer, for example. If the payment credit is refunded to the customer's credit card, a receipt so indicating may be printed in step S428. Of course, the credit card payments may be substituted with other payment methods such as debit cards, cash, or checks, for example.

If the computer system in step S418 determines that the customer did not return the DVD prior to the end of the rental period, the DVD is preferably returned to the customer in step S430. The computer system then informs the customer that the rental period had expired and that the customer has purchased the DVD in step S432 (e.g., via a video screen and/or a printed receipt).

If the customer chooses to keep the DVD, he/she may simply decide not to return it. Because the full purchase price was originally charged, the system does not necessarily need to do anything more. In one embodiment, the steps S402 and S428 (ask whether wish to purchase or buy, and charge if purchase) may be eliminated. In such embodiment, all DVDs may have the sales information written on it and the consumer may decide whether to keep the DVD at the time other than the time of purchase.

Figure 5:
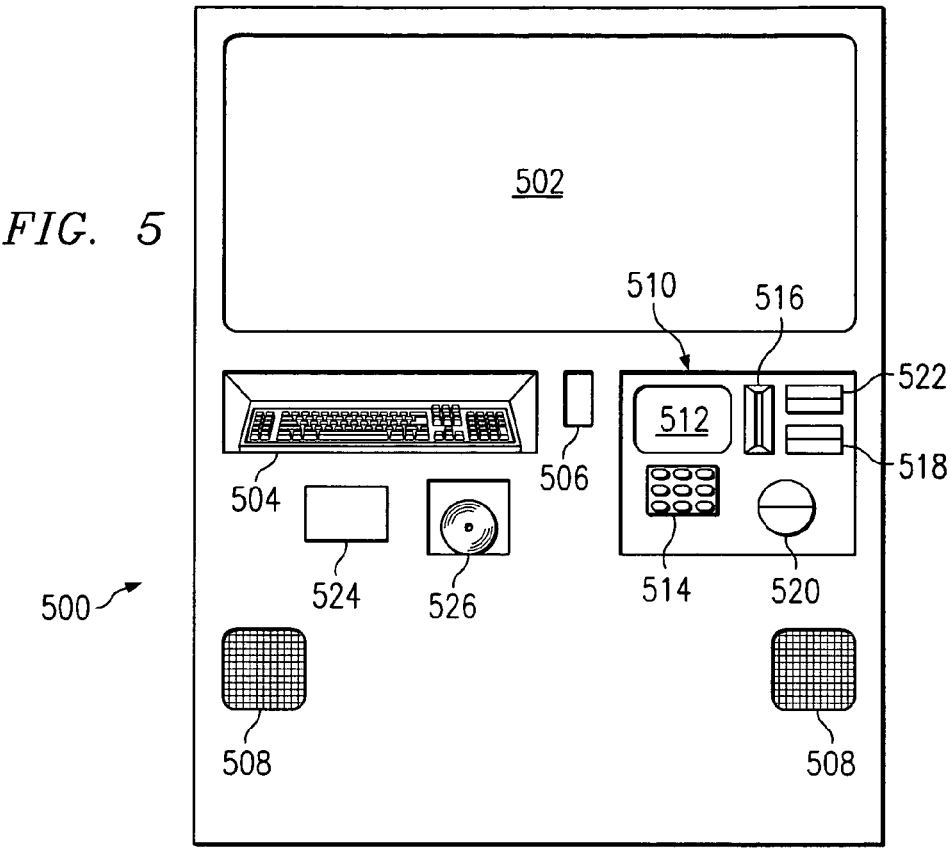
FIG. 5 illustrates a kiosk according to an embodiment of the present invention.

FIG. 5 shows an example kiosk 500 that may be compatible with various embodiments of the present invention. The kiosk 500 may include a video screen 502, a keyboard 504, a pointing device 506, and speakers 508, for example. The kiosk 500 may have a payment collection panel 510, which may include a first instruction panel 512, a keypad 514, a credit card reader 516, a currency detector 518, a change cup 520, and a receipt printer 522, for example. Also, the kiosk 500 may have a second instruction panel 524 and a DVD dispenser 526.

The video screen 502, the keyboard 504, the pointing device 506, and the speakers 508 allow a customer to interact with the kiosk 500 when selecting a video for rental or purchase. Preferably, the video screen 502 is a touch screen and the pointing device 506 is a mouse or a touch pad, for example. Because both the touch screen and the pointing device provide for customer input, either may be eliminated. Advantageously, the display 502 may be used to show advertisements, previews, or other media while the customer is waiting, or while no customer is using the kiosk to provide advertising to passersby, for example.

The payment collection panel 510 may provide a means for the customer to pay for a video rental or purchase by credit card, debit card, or gift card via the credit card reader 516, or by cash via a currency detector 518, for example. The customer may receive a cash credit from the change cup 520 when appropriate. Alternatively, the customer may be mailed a check from a location remote for a refund. The customer may receive a printed receipt from a receipt printer 522. The customer receives the rented video on a DVD from the DVD dispenser 526. When required, the customer may return the rented video to the DVD dispenser 526 (or another device for receiving discs, for example.

Figure 6:
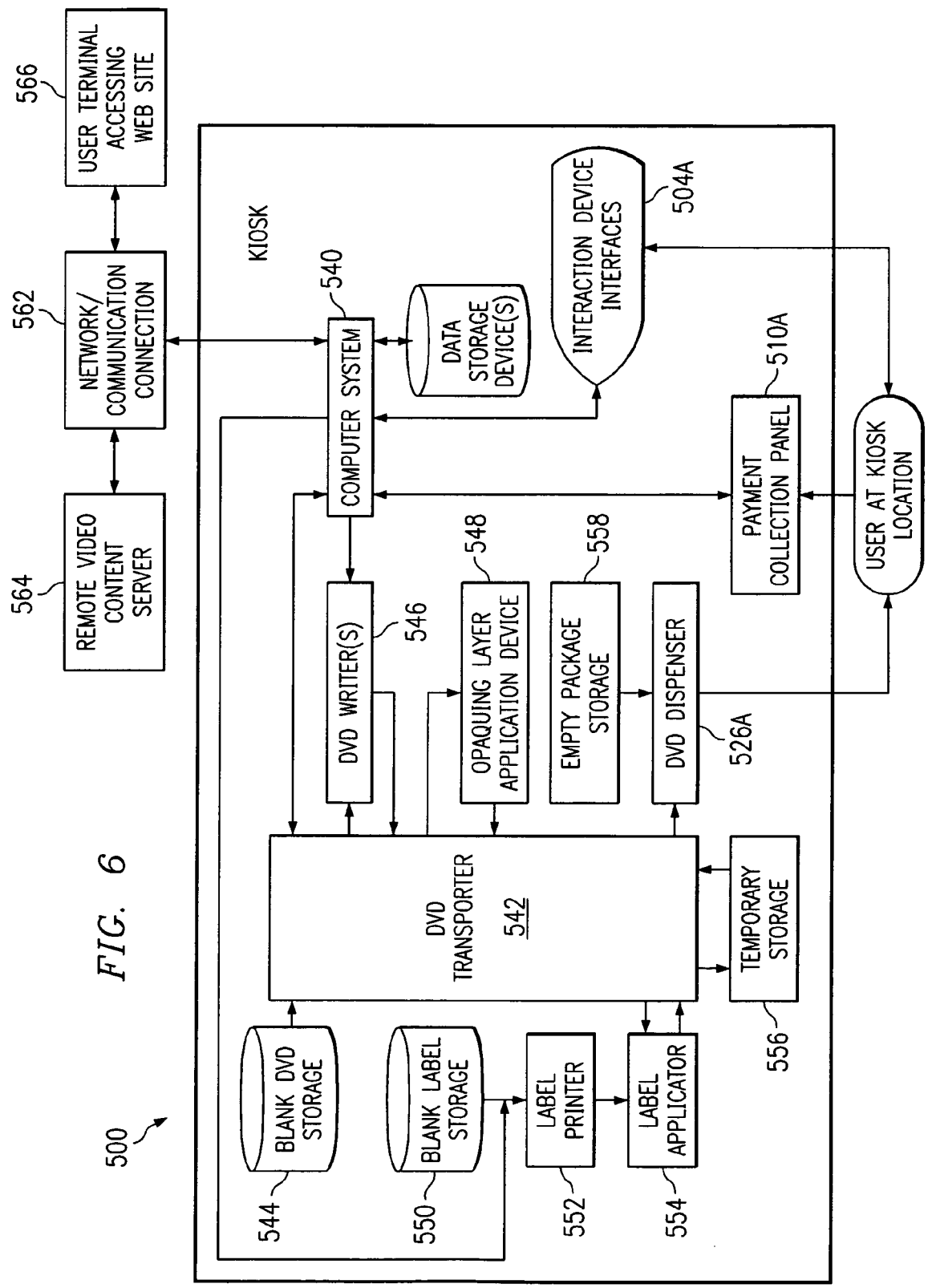
FIG. 6 is an overview of the internal elements of a kiosk according to an embodiment of the present invention.

FIG. 6 shows some possible internal elements of the example kiosk 500, whose exterior is shown in FIG. 5. The customer may interact with the kiosk 500 through interaction device interfaces 504A via a computer system 540 that is connected to the various internal elements and controls their interaction. The customer may further interact with the kiosk through the payment collection panel 510A, which also is preferably connected to the computer system 540.

The computer system 540 may control a DVD transporter 542 that moves a DVD from one internal element to the next. Blank DVDs may be stored in a blank DVD storage unit 544. The DVD transporter 542 may be used to move a blank DVD to a DVD writer 546. The DVD writer 546 is preferably capable of writing multiple DVDs at a single time, but a device that one writes one medium at a time may be used as well. The DVD writer 546 receives the video content that will be written to the blank DVD from the computer system 540. Once the DVD has been written, the DVD transporter 542 may move the written DVD to an opaquing layer application device 548. Details regarding the opaquing layer will be described in greater detail below.

Blank labels for the written DVDs may be stored in a blank label storage unit 550. A label printer 552 may receive information, such as the title of the written DVD from the computer system 540. The DVD transporter 542 may then move the written DVD to a label applicator 554 that places the printed labels on the written DVD. Alternatively, information may be printed directly on a non-read side of the disc rather than a label, for example. The DVD transporter 542 may then place the completed DVD into a temporary storage unit 556. When the customer is ready to receive the completed DVD, i.e., the rented video, the DVD transporter 542 moves the DVD to the DVD dispenser 526A. In the DVD dispenser 526A, the DVD may be placed in an empty package that had been stored in an empty package storage unit 558, for example. The packaged DVD is then provided to the customer.

When the customer first makes a video selection, the computer system 540 may determine if the video content is stored in a local video content server within the kiosk 500. If the video content is not stored in the local video content server, the computer system 540 may connect to a network/communication connection 562. The network/communication connection 562 may receive the desired video content from a remote video content server 564 that may contain many thousands of videos in digital video content format and provides these to the computer system 540, which may store the video content on the local video content server. Preferably, the most frequently selected video content is stored on the local video content server. The most frequently selected video content may be updated either by the computer system 540, or remotely over the network/communication connection 562.

In certain embodiments of the present invention, the customer may use the Internet to make a video selection. In such cases, the customer visits the appropriate website via a computer 566, which may be located within the customer's home or office, for example. The website is preferably located on a server which also functions as the network/communication connection 562. Once the customer has selected a video for rental or purchase, the customer goes to the kiosk 500 to receive the completed DVD (unless the completed DVD will be delivered).

Figure 7:
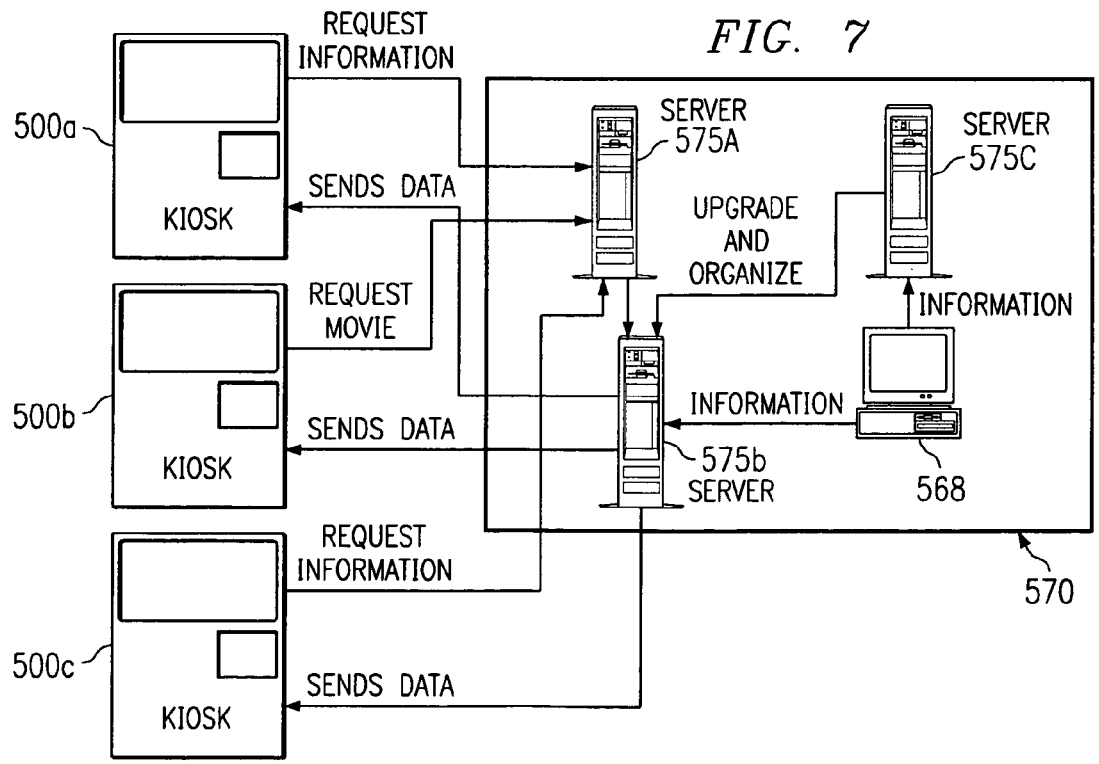
FIG. 7 is a diagram showing an embodiment system including a main office and various kiosks.

FIG. 7 shows an example main office 570 for providing video content to various kiosks 500A, 500B, 500C and for hosting a website that a customer may use to order digital content. The main office 570 may include network/communication connections that allow it to communicate with each of the various kiosks 500A, 500B, 500C. These communication connections are indicated by the various lines on the FIG. 7. The main office 570 is illustrated in FIG. 7 as being located in a single location. It is understood, however, that the main office may be distributed amongst many locations that may be physically far from one another (e.g., across a state, nationally, or even internationally).

The main office 570 includes various equipment. Examples shown are a main computer 568 and servers 575A, 575B, 575C (in general, 575). Various functions of these computers will be discussed below to demonstrate example operations that may occur. It is understood that various ones of these operations may be performed by other equipment in the system, may be modified, or may be eliminated.

In one preferred embodiment of the invention, certain of the movies will be stored locally at the kiosks 500 while others will be stored at the main office and transmitted to a kiosk upon demand. In an alternate embodiment, all of the movies will be stored at the kiosks thereby being readily available upon order. In this case, the main computer 568 could be used to upgrade new movies and cause the movies to be sent to the various kiosks 500. In another alternate embodiment, the kiosk stores none of the movies but rather sends a request whenever a movie is needed.

In yet another embodiment (not shown), most or all of the computers may be located in kiosks that are networked together, wherein some or all of the kiosk computers act as storage locations and/or servers. For example, a certain movie may be stored at a first kiosk, and when the movie is needed by a second kiosk, the movie may be obtained from the first kiosk via a network/communication connection. Also, a certain kiosk or kiosks may have a computer or computer partition that acts as a server and/or a website host. Hence, the storage capacity and/or computer processing power of the system may be distributed among the kiosks in part or in whole. Furthermore, some kiosks may house the same information or provide the same processing steps as others to provide redundancy in the system. One of ordinary skill in the art will realize that there are many possible network configurations for a kiosk system of an embodiment.

Various communications may occur between the kiosks 500 and the main office 570. These communication may include receiving requests from the various kiosks 500 for customer selected videos and transmitting the requested video content from the remote video content server (e.g., one or more of the servers 575). Other communications may provide account and financial information received from the various kiosks 500, for example.

In one preferred embodiment, main computer 568 will control the network communication connections and the remote video content server, for example. The computer 568 may keep track of sales for royalty payment purposes as well as membership information. By using the computer 568, the various kiosks 500 may be remotely upgraded to store the most recent releases on their respective local video content servers, for example.

A certain one or ones of the servers may be used as file servers. The file servers may keep all movies on file in case any kiosk does not have a particular movie stored locally, for example. The files are preferably kept organized and easy to find. Other server(s) may operate as data servers, which send new information to the kiosks. These servers may also receive sales records to store in the main computer.

A number of alternatives to the embodiments are envisioned. To promote sales, the computer system 540 may play clips of different videos on the video screen 502 and the speakers 508, for example. These clips of different videos may include videos of movies or advertisements for products available at the grocery store, mall, etc., at or near the location of a kiosk 500. By placing a kiosk 500 in a pizza delivery store, for example, the customer could order a pizza and a video all at one time for concurrent delivery. This is especially feasible as the pizza delivery store is not faced with the high inventory costs and space requirements of a traditional video rental store.

As noted above, a wide variety of digital content is available. This digital content may include videos, music, and software such as games, for example. In another embodiment, the software may be designed for use on a personal computer. In this embodiment, the kiosk 500 may be placed in a store selling computers, for example. The customer may then custom select the desired software for a new computer being purchased. Each software manufacturer could provide its own kiosk in this situation and provide custom software packages and pricing based on customer information. This customer information could include primary use for the new computer, such as word processing, games, etc., and/or details regarding the new computer such as operating system, processor speed, amount of memory, and hard disk size, for example.

The payment collection panel 510 may be modified to include a gift card dispenser. In such case, the customer may then be able to purchase gift cards from the kiosk 500 (e.g., by using the keyboard 504 and the pointing device 506, etc. to enter a value amount for the gift card). The value amount may be for a fixed dollar value or for a certain number of video rentals or purchases, for example. Restrictions may also be placed on the gift card such as limiting the class of video that can be rented, for example. The gift card could then be redeemed by reading the gift card with the credit card reader 516.

In certain embodiments of the present invention where the DVD will be purchased, not rented, an opaquing layer may not be applied. However, in other embodiments where it is desired to manage and control the lifespan of the medium, some way or means of making the medium unreadable after a period of time is implemented.

The opaquing layer application device 548 (see e.g., FIG. 6) may treat with or place an "opaquing layer" on the DVD. The "opaquing layer" may be an initially transparent coating present on or placed upon the side of the DVD that is optically read, for example. The "opaquing layer" becomes opaque, partially opaque, or read-inhibiting (in some way) due to the passage of time, exposure to air, and/or exposure to light, for example, such that the DVD is effectively unreadable (e.g., part or all of the medium becomes unreadable for discerning the content originally written thereon when read by a common optical media reading machine). Therefore, the readability of the digital content on the DVD is not permanent, but has a predetermined life, as desired for renting a video. Once the "opaquing layer" has changed, the DVD may be disposed of or recycled, and need not be returned to the kiosk 500.

Stated another way, the optically-readable medium (e.g., a CD, DVD, etc.) of an embodiment may have a changeable portion therein or thereon. When activated (e.g., by passage of time, by air exposure, and/or by light exposure), the changeable portion is adapted to physically change over a period of time to a degree that at least part of the medium becomes unreadable by an optical media reading machine, for example. There are many ways and means that may be used to provide such a changeable portion on or in a medium, any of which may be incorporated into an embodiment of the present invention, as appropriate. The following U.S. patents disclose some exemplary, currently known ways and means of making a medium become unreadable after a period of time, and these U.S. patents are incorporated by reference herein: U.S. Pat. Nos. 6,343,063; 6,011,722; 6,511,728; 6,537,635; and 6,338,933. One of ordinary skill in the art will realize many possible ways of making an optically-readable medium become unreadable after a period of time that may be incorporated into an embodiment of the present invention.

A writeable optically-readable medium of an embodiment provides a blank or previously written medium that may be written/rewritten upon with digital data (e.g., by a laser), for example. Typically, a laser used for writing the data on the medium has a greater light intensity and heat output than a reading laser, which may be provided by simply increasing the power to the laser in some cases. There are a number of different ways that an optically-readable medium may be writeable, any of which may be incorporated into an embodiment of the present invention, as appropriate for a given application or embodiment. One exemplary way of providing a writeable optically-readable medium for an embodiment is described in U.S. Pat. No. 5,348,841, which is incorporated by reference herein and which describes a medium with a layer of dye impregnated polymer that may have its optical properties changed by a writing laser beam in select locations. There are also many ways to provide a writeable-erasable optically-readable medium, any of which may be incorporated into an embodiment of the present invention as a writeable medium. Some exemplary ways of providing a writeable-erasable optically-readable medium for an embodiment include (but are not limited to): a magneto-optic disc system (see e.g., U.S. Pat. No. 4,794,560, which is incorporated by reference herein); and a disc having a crystalline layer that may have select locations changed to an amorphous form (having different optical/reflective properties than the crystalline form) by the heat of a laser beam, for example. One of ordinary skill in the art will realize many possible ways of providing a writeable optically-readable medium that may be incorporated into an embodiment of the present invention.

FIG. 8 is a flowchart 700 illustrating a process in accordance with a fifth embodiment of the present invention. A request is received from a customer, and the request includes an indication of a desired digital content (see block 702 in FIG. 8).

As in most or all embodiments of the present invention, such request may be made at the point of sale (e.g., a store, a kiosk, a van) or from a location remote from the point of sale (e.g., at a website, at another location, over a telephone using prompts, over a telephone by speaking to a person or computer, and combinations thereof). Also in an embodiment, such request may include other information or choice indicators (besides the indication of desired digital content), including (but not limited to): a version of the desired digital content (discussed further below), a location choice for the point of sale, choice of another item (e.g., food, drink), delivery address, mailing address, customer information, membership account information, payment information, payment means, advertisement category choice, and combinations thereof, for example.

In most or all embodiments of the present invention, the desired digital content is essentially any information or data that may be stored in a digital format. The desired digital content of an embodiment may include one or more things. Examples of desired digital content of an embodiment include (but are not limited to): video, audio, text, images, web pages, hyperlinked text, a movie, a music video, an interactive video, a game, a television show, a television series, a cartoon, computer software, a still advertisement, an advertisement banner, a commercial, a movie preview, a public service announcement, an educational film, a document, sales information, information about a product, information about a service, information about real estate, information about a business having a location with a same city as the point of sale, information about a vacation destination, educational information, information about a religion, and combinations thereof, for example.

As in most or all embodiments of the present invention, the request may be processed at or routed to a computer system at a selected point of sale. The point of sale may be selected by a computer algorithm based on customer's address or current location, and/or it may be selected by the customer, for example. As in most or all embodiments of the present invention, if the desired digital content is not already stored at the point of sale, it will be provided to a computer system at the point of sale from another computer system via a network/communication connection. Such network/communication connection in an embodiment may be provided in a variety of ways, including (but not limited to): satellite transmission, wire, fiber-optic cable, wireless communication, radio-wave transmission, microwave transmission, light-wave communication, and combinations thereof, for example.

As in most or all embodiments of the present invention, the point of sale may be any of a variety of facilities, including (but not necessarily limited to): a stand alone kiosk, a kiosk, a cabinet in a store, a counter in a store, a machine in a store or restaurant, a van (or other motor vehicle) having equipment therein for preparing the medium for the customer and/or for delivering the medium to the customer, and combinations thereof, for example. A preferred point of sale for an embodiment is a kiosk that may be placed in a variety of locations, such as (but not necessarily limited to): an unmanned-stand-alone building, a convenience store, a restaurant, a video rental store, a gas station, a grocery store, a pizza delivery shop, a shopping mall, a shopping center, a booth, a parking lot, an apartment building, a laundry facility, a dormitory, a school campus, a library, a book store, a music store, a metro station, a bus station, an airport, a hotel, an exercise facility, a fitness club, an arena, a convention center, and combinations thereof, for example. The point of sale of an embodiment may or may not be a location where the customer picks up the finished medium. For example, the medium may be delivered to the customer from the point of sale by a delivery person or a delivery service (e.g., United States Postal Service, United Parcel Service, Federal Express, food delivery service, etc.). In many cases where the medium is not delivered to the customer, the customer will pick up the medium from the point of sale. For example, if the point of sale is a kiosk, the medium may be dispensed to the customer at the kiosk when the medium is ready or when the customer arrives at the kiosk.

As another example, the point of sale may be a van having equipment therein for receiving request information (e.g., directly from the customer or indirectly via another computer system located remotely from the van) and preparing the medium for the customer. For example, such a van may be parked at an apartment complex, dormitory, college campus, shopping mall, convention center, arena, concert hall, or event location, for example. Hence, a customer may walk up to the van and place an order in person at the van, and later pick up the order from the van, for example. Alternatively, the customer may place the order at the van and have it delivered to him/her later (rather than waiting for it) (e.g., via mail or parcel delivery service, or via the van), for example. As yet another example where the point of sale is a van, a customer may provide a request via a website or telephone and such request may be transmitted to the van (e.g., via satellite or wireless communication), then the medium may be prepared in the van (e.g., by an automated process with or without assistance from a person in the van), and then the van may deliver the completed medium to the customer. Hence, a certain van may cover a certain geographical area, and the location and/or activities of such van may be tracked by a local or central office, for example. In still another example where the point of sale is a van, the van could drive through a certain route and receive requests from persons walking up to the van (like an ice cream truck). Or, such a van could make regular stops at certain locations according to a schedule. In yet another example embodiment, a kiosk or machine on a bus, train, or airplane could be a point of sale. In such case, a customer may submit a request and have the medium ready by the time the bus/train/plane arrives at his/her destination, for example. With the benefit of this disclosure, one of ordinary skill in the art will likely realize many other possible point of sale options.

Referring again to the flowchart 700 for the fifth embodiment in FIG. 8, a writeable optically-readable medium is provided at the point of sale (block 704). The writeable optically-readable medium in this embodiment has a changeable portion therein or thereon, and has a removable protective cover operably installed thereon. When activated, the changeable portion is adapted to physically change over a period of time (e.g., 3 days) to a degree that at least part of the medium becomes unreadable by an optical media reading machine due to the change in the changeable portion. The protective cover is adapted to inhibit and/or prevent activation of the changeable portion of the medium when operably installed. In an embodiment (i.e., this embodiment or other embodiments) of the present invention, a protective cover may have any of a variety of forms. For example, the protective cover may be a removable layer. Such layer may have a substantially uniform thickness for a majority of its body. For example in the case where data is written to the medium through the layer (i.e., the protective cover), such layer may have a uniform thickness where it covers the portion of the medium where the data is written and the material of such layer may allow a writing laser to pass through it without interfering with the writing process. Such layer may have a thicker portion that extends beyond the medium to act as a tab for removing the layer more easily and readily, for example. As another example, a protective cover may be a sealed enclosure formed about the medium. As yet another example, a protective cover may be a package that retains the medium. Such package may be partially or completely removable, for example. A protective cover may be pliable, rigid, semi-rigid, tight-fitting, loose-fitting, or any combination thereof, for example. As still another example, a protective cover may cover only part of the medium, or may only cover a part of the medium needed to inhibit the changeable portion from changing, for example. The protective cover of an embodiment may be made from a variety of materials, including (but not limited to): plastic, polymer, cloth, fabric, animal skin, metal, wood, nylon, rubber, latex, acrylic, lacquer, fiberglass, carbon, silicon, or any combination thereof, for example.

Referring again to FIG. 8 and continuing with the description of the fifth embodiment, the desired digital content is written on the medium at the point of sale (block 706). Hence, in the fifth embodiment the protective cover remains operably installed on or about the medium during the writing. Thus, in this case the protective cover should not interfere with the writing process. If the point of sale is a kiosk, for example, the digital content may be optically written on the medium within the kiosk. In such case, a stack of blank writeable optically-readable media (e.g., writeable DVDs) may be stored in the kiosk and retrieved as needed to prepare a medium to fulfill a customer's request, for example.

At the point of sale, the protective cover may be removed prior to or while providing the written medium to the customer (see blocks 708 and 710 in FIG. 8). In this embodiment, removing the protective cover initiates or activates the changeable portion of the medium so that after some period of time, the medium will become unreadable. For example, the protective cover may be removed just after the medium is written. In such case, the changeable portion will be activated and the clock will start ticking on the changeable portion just after the medium is written. In this case, it may be assumed that the customer will be retrieving or obtaining the medium shortly after the medium is written with the desired digital content. The period of time required for the medium to become unreadable may vary for different designs. Typically, the changeable portion will be designed to provide an approximate period of time or range of time that ensures the customer has time to view or use the medium as advertised or specified to the customer. Some changeable portions may include chemicals (e.g., antioxidants) that delay a chemical reaction (i.e., delay the read-inhibiting physical change of the changeable portion) for some period of time to ensure that the medium is fully readable during this time. Although not necessary in all cases, the changeable portion preferably will experience a rapid physical change after some initial period of time (e.g., after an antioxidant is dissipated).

As another example for the fifth embodiment, the protective cover may be removed at some time after the medium is written, but before the written medium is dispensed to or delivered to a customer. In yet another example of the fifth embodiment, the protective cover may be removed as the medium is being provided to the customer. If the written medium is being dispensed to a customer from a kiosk when the customer comes to pick up the written medium, for example, the protective cover may be removed within the kiosk as the written medium is being dispensed to the customer. Hence, in such case the clock would start ticking on the changeable portion when the customer receives the written medium. If the written medium is being delivered to the customer (e.g., along with a pizza delivery), the protective cover may be removed by the delivery person just before handing the written medium to the customer. Thus, in such case the clock would start ticking on the changeable portion when the medium is delivered to the customer.

FIG. 9 is a flowchart 712 illustrating a process in accordance with a sixth embodiment of the present invention. The sixth embodiment is similar to the fifth embodiment in the first three steps (blocks 702, 704, and 706). The sixth embodiment is a case where the customer will come to the point of sale to pick-up the written medium. In this embodiment, the machine and/or person dispensing the written medium waits for an indication that the customer is ready for the written medium to be provided to him/her (block 714). When or after an indication is provided that the customer is ready for the written medium to be provided to him/her (block 716), the protective cover is removed (block 708) and the written medium is provided to the customer (block 710). For example, if the point of sale is a kiosk in a shopping mall, the customer may place an order at the kiosk (i.e., enter a request), shop in the mall while the medium is being prepared, and later return to the kiosk to obtain the written medium. In such case, the customer may somehow inform the kiosk that he/she has returned for the written medium (e.g., inputting a code, inserting a membership card, inserting an identification card, inserting a credit card, inputting customer information, etc.). Thus, in the sixth embodiment, the clock may start ticking for the changeable portion when the customer comes to the point of sale to obtain the written medium.

FIG. 10 is a flowchart 718 illustrating a process in accordance with a seventh embodiment of the present invention. The seventh embodiment is similar to the fifth embodiment (see FIG. 8), except that the protective cover is removed prior to the writing of the desired digital content on the medium. For example, if the protective cover disrupts or hinders the writing process, it may be necessary to remove the protective cover before the writing process. In such case, the clock may start ticking on the changeable portion when the protective cover is removed to write the digital content on the medium.

FIG. 11 is a flowchart 720 illustrating a process in accordance with an eighth embodiment of the present invention. The eighth embodiment is another variation of the fifth embodiment (see FIG. 9). In the eighth embodiment, the writeable medium initially has a protective package operably installed thereon (block 722 in FIG. 11). That is, the protective package acts as a protective cover to inhibit the activation of a changeable portion of the medium. The desired digital content is written on the medium with the protective package operably installed on the medium (block 724). The written medium is provided to the customer with the protective package still operably installed on the medium (block 726). Preferably, the package somehow obstructs normal use of the medium in a common optical media reading machine so that at least part of the package will need to be removed by the customer before reading the digital content from the medium. In such case, the package may extend from the medium to an extent that the medium cannot be used in a common optical media reading machine. On a CD or DVD, for example, the protective package of an embodiment may partially or completely cover or block the center hole of the disc to prevent the disc from being loaded in a common player. Hence, an object of such an embodiment is to require the customer to remove part or all of the package before using the medium so that the changeable portion is activated (i.e., clock starts ticking on the period of time for changing the changeable portion) upon opening/removing the package. In such cases, the point of sale (e.g., machine, kiosk) will likely need a custom or specialized mechanism to retain and spin the medium for the writing process. For example, if the center hole of a DVD is covered by the package, an optical writing machine at the point of sale may be adapted to retain the medium at some portion of the package (e.g., portions or tabs of the package extending from the medium).

Because the protective package remains operably installed during the writing of digital content on the medium in the eighth embodiment, the package should not interfere or hinder the writing process. For example, the protective package may have a material composition and structure that allows a writing laser to pass through the protective package without disrupting the writing. The protective package may be located on the medium in a way that a writing laser does not need to pass through the package. For example, the protective package may be located on a label-side (opposite the read side) of a medium. In such case, even though the protective package would not come between the stored data and the reading laser beam during use of the medium, the package may still prevent normal use of the medium in a common media player, and thus still require that the package be removed by most customers. Thus, in such cases, the clock may not start ticking for the changeable portion until the customer opens or removes part or all of the package to play or use the digital content stored on the medium.

FIG. 12 is a flowchart 728 illustrating a process in accordance with a ninth embodiment of the present invention. In the ninth embodiment, the writeable optically-readable medium initially has a first protective cover operably installed thereon to inhibit or prevent the activation of a changeable portion on the medium (block 730 in FIG. 12). At some point before writing the desired digital content on the medium (e.g., after receiving the request and just before writing the digital content on the medium), the first protective cover is removed at or within the point of sale (block 732). This may be the case because the first protective cover may disrupt or hinder the writing process, for example. It may or may not be necessary to completely remove the first protective cover. With the first protective cover out of the way, the desired digital content is written on the medium (block 734). After writing the desired digital content on the medium, a second protective cover is operably installed on the medium (block 736). Then, at some point the written medium is provided to the customer with the second protective cover operably installed on the medium (block 738). A preferred object of this embodiment is that the customer must remove the second protective cover before accessing the content stored on the medium.

When the first protective cover is removed for the writing step, the changeable portion of the medium may be temporarily activated. For example, if the changeable portion is adapted to react with air to cause it physically change, the changeable portion may begin to react during a brief period of time between the removal of the first protective cover and the installation of the second protective cover (i.e., during the writing). In such case, the installation of the second protective cover may halt or stall the changing of the changeable portion until the second protective cover is removed, for example.

In another variation on the ninth embodiment, the removal of the first protective cover, the writing of digital content on the medium, and the installation of the second protective cover may be performed in a controlled environment to prevent or inhibit the activation of the changeable portion. For example, if the changeable portion is activated by certain light wavelength(s), the controlled environment may be substantially absent of such light. As another example, if the changeable portion is activated by ambient air or water in ambient air, for example, the controlled environment may be a vacuum chamber, a low pressure chamber, a chamber lacking humidity, a chamber filled with some inert gas, a chamber lacking an ingredient or gas that would activate the changeable portion, or some combination thereof, for example. Thus, by keeping the medium in a controlled environment while no protective cover is present or while no protective cover inhibits a change in the changeable portion, the changeable portion may be kept from being activated during the writing process.

The first protective cover may be completely different from the second protective cover. For example, the first protective cover may be a removable layer that covers only part of the medium and the second protective cover may be a sealed package that completely encloses the medium or the medium and a disc caddy. As another example, the second protective cover may be made of a material that restricts or inhibits a reading laser from reading the content stored on the medium.

FIG. 13 is a flowchart 740 illustrating a process in accordance with a tenth embodiment of the present invention. The tenth embodiment is essentially the same as the ninth embodiment, except that the second protective cover is the first protective cover. In other words, the "first" protective cover is removed or out of the way during the writing process (block 742 in FIG. 13) and then the same protective cover is re-installed on the medium (block 744).

FIG. 14 is a flowchart 746 illustrating a process in accordance with an eleventh embodiment of the present invention. In this embodiment, the writeable optically-readable medium has a first changeable portion therein or thereon (block 748). When activated, the first changeable portion is adapted to physically change over a period of time to a degree that at least part of the medium becomes unreadable by an optical media reading machine. The medium also initially has a removable protective cover operably installed thereon to inhibit activation of the first changeable portion. This protective cover has a second changeable portion. When activated, the second changeable portion is adapted to physically change over a period of time to a degree that at least part of the medium becomes unreadable by an optical media reading machine. Hence, at least part of the protective cover extends over at least part of the medium where data may be stored on the medium. The desired digital content is written on the medium with the protective cover operably installed and through the protective cover (block 750).

In some way, the second changeable portion of the protective cover is activated (so that it will change and inhibit the readability of the medium) at some point before the written medium is provided to the customer (blocks 752 and 754 in FIG. 14). An object of this embodiment is that the customer will have to remove the protective cover to use the medium, and in doing so the first changeable portion will be activated to change over a period of time. For example, the second changeable portion may be activated during the writing by a laser used for the writing. As another example, the second changeable portion may be activated by a separate light source (i.e., different and/or separate from the writing laser) during the writing, or after the writing. The second changeable portion may be activated by ambient light when dispensed at the point of sale from a machine that produced the written medium, for example. As another example, the second changeable portion may be activated by exposure to some sort of substance or controlled environment within the point of sale, such as (but not necessarily limited to): a wet environment, water, a solvent, a chemical, a powder, a gas, heat, low temperature, high pressure, low pressure, shaking, spinning, ultrasonic sound waves, radio frequency sound waves, or some combination thereof, for example. In such an embodiment, the second changeable portion may be different in type and/or kind than the first changeable portion. Alternatively, the second changeable portion may be of the same type or mechanism as the first changeable portion, but with a different period of time in which it takes for the change to take place (i.e., the first changeable portion requires a longer period of time to render the medium unreadable than the second changeable portion), for example. With the benefit of this disclosure, one of ordinary skill in the art will likely realize many other variations on the eleventh embodiment.

Figure 15:
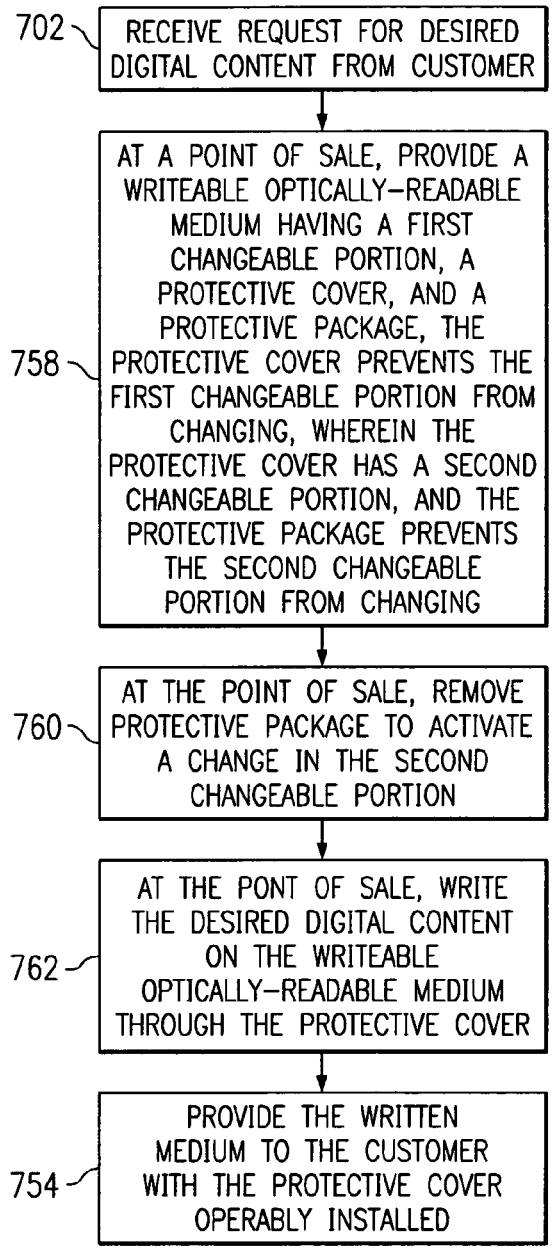

FIG. 15 is a flowchart 756 illustrating a process in accordance with a twelfth embodiment of the present invention. Some cases of the twelfth embodiment may be other variations on the eleventh embodiment (see FIG. 14). In the twelfth embodiment, a writeable optically-readable medium having a first changeable portion is initially provided at the point of sale with a removable protective cover and a removable protective package thereon. As in the eleventh embodiment, the protective cover of this embodiment has a second changeable portion. The protective cover inhibits activation of the first changeable portion. The protective package inhibits activation of the second changeable portion (block 758 in FIG. 15). At the point of sale (e.g., within a kiosk), the protective package is removed to initiate the activation of the second changeable portion prior to (preferably just prior to) the writing of the digital content on the medium (block 760). The desired digital content is then written on the medium with the protective cover operably installed and through the protective cover (block 762), as at least part of the protective cover extends over at least part of the medium where data will be written. Preferably, the writing is performed before the second changeable portion has rendered the medium unreadable, as the changed second changeable portion might disrupt or inhibit the ability to write the digital content on the medium. But, the second changeable portion is preferably changed so that it will inhibit the readability of the medium prior to providing the written medium to the customer, or shortly thereafter. Hence, a preferred object of this embodiment is that the customer must remove the protective cover to access the content stored on the medium (i.e., to activate the first changeable portion). And thus, the timing of the change of the second changeable portion may need to be coordinated with the writing of the content on the medium. The writing laser may be used as catalyst to speed up the change in the second changeable portion, as an example. The protective cover may be exposed to a substance or environment (as an added step before the medium is provided to the customer) to accelerate the change in the second changeable portion, as another example. With the benefit of this disclosure, one of ordinary skill in the art will likely realize many other variations on the twelfth embodiment.

Figure 16:
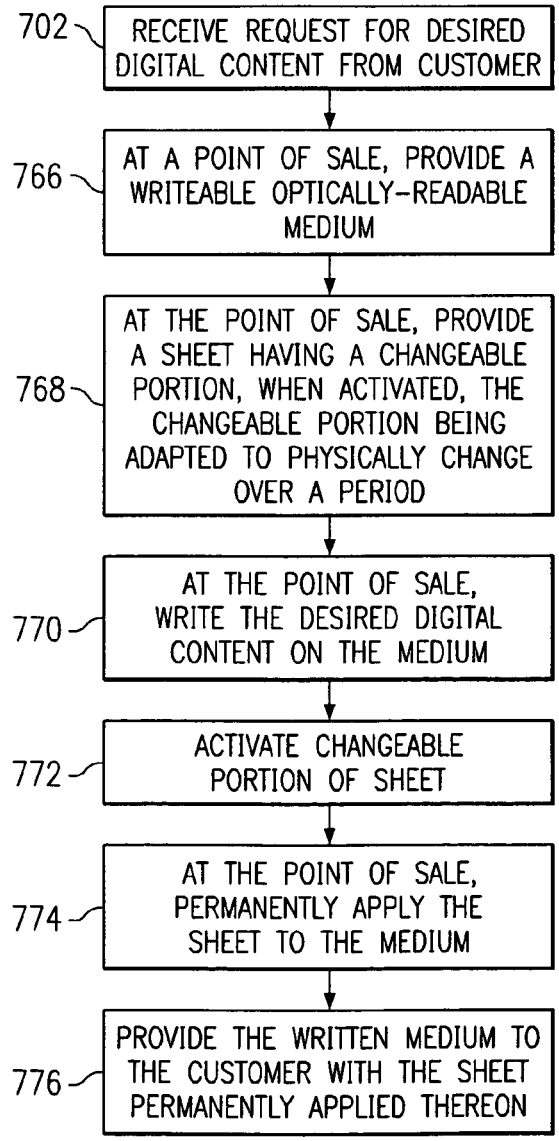

FIG. 16 is a flowchart 764 illustrating a process in accordance with a thirteenth embodiment of the present invention. In the thirteenth embodiment, the writeable optically-readable medium is provided (at the point of sale) without having thereon or therein a changeable portion adapted to change over a period of time to make the medium at least partially unreadable (block 766). Instead, the changeable portion is provided separately from the medium on, in, or as a sheet that later may be permanently applied to the medium. Such sheet could be flexible or rigid, for example. The sheet could be made from lexan, acrylic, and/or plastic, for example. The sheet may be adapted to partially or completely cover a side of the medium, for example. In this embodiment, the sheet is covered (partially or wholly) by a protective cover or package to inhibit or prevent the changeable portion of the sheet from being activated and changing (block 768). At the point of sale, the desired digital content is written on the medium (block 770). Then, the package/cover is removed from the sheet to activate the changeable portion of the sheet (block 772). The sheet may be activated by simply removing the package/cover, or a separate process/step may need to be performed to activate the sheet after removing it from the package/cover. The sheet may be exposed to a substance or environment (as an added step before the medium is provided to the customer) to activate the change in the changeable portion of the sheet, for example. The sheet may be permanently applied to the written medium (block 774) at the point of sale, e.g., before, after, or while the changeable portion is activated. Hence, the clock starts ticking on the changeable portion before the customer is provided with the written medium in this embodiment. Then, the written medium is provided to the customer with the sheet permanently applied thereon (block 776). The written medium should be capable of being used and accessed with the sheet applied (until the changeable portion changes). Thus, in this embodiment the changeable portion of the sheet, which is preferably unremovable or very difficult to remove, changes over a period of time so that eventually part or all of the content stored on the medium becomes unreadable due to the changeable portion.

FIG. 17 is a flowchart 778 illustrating a fourteenth embodiment of the present invention, as a variation on the thirteenth embodiment. In the fourteenth embodiment, the sheet may be applied to the medium before the writing. In such case, the writing laser may be used as a catalyst to initiate the change in the changeable portion, for example. In another variation on the fourteenth embodiment, the changeable portion may be activated by a process/step separate from and/or in addition to the writing laser. In such case, the changeable portion may be activated or catalyzed by exposure to some sort of substance or controlled environment within the point of sale, such as (but not necessarily limited to): a wet environment, water, a solvent, a chemical, a powder, a gas, heat, low temperature, high pressure, low pressure, shaking, spinning, ultrasonic sound waves, radio frequency sound waves, or some combination thereof, for example.

FIG. 18 is a flowchart 780 illustrating a fifteenth embodiment of the present invention, as another variation on the thirteenth and fourteenth embodiments. In the fifteenth embodiment, the sheet may be permanently applied to the writeable optically-readable medium prior to the writing of the desired digital content thereon (blocks 770 and 774 in FIG. 18). At some point after writing the desired digital content on the medium, the written medium is provided to the customer with the sheet permanently applied thereon (block 776). Then, the change in the changeable portion is initiated, activated, or accelerated by the reading laser when the content is accessed from the medium (block 772). As a variation on the fifteenth embodiment, the sheet may be applied to the medium (block 774) after the writing step (block 770).

FIGS. 19 and 20 are flowcharts 782 and 784 illustrating sixteenth and seventeenth embodiments of the present invention, respectively, which are further variations upon the thirteenth embodiment shown in FIG. 16. In the sixteenth embodiment, the sheet is activated (block 772) before or in parallel to the desired digital content is written to the medium (block 770). In the seventeenth embodiment, the desired digital content is written to the medium (block 770) prior to applying and activating the sheet (blocks 774 and 772). In the sixteenth embodiment, the sheet may be activated by some process/step prior to being applied to the medium. In the seventeenth embodiment, the sheet may be activated after being applied to the medium. The seventeenth embodiment may be preferable over the sixteenth embodiment because the activation of the changeable portion of the sheet may be initiated at a time much later than the application of the sheet. This may be favorable, for example, if the means of applying the sheet to the medium requires some curing time, or if the means of activating the changeable portion affects the ability of the sheet to remain applied to the medium.

FIG. 21 is a flowchart 786 illustrating an eighteenth embodiment of the present invention. In this embodiment, a writeable optically-readable medium is provided at the point of sale, and the medium has a first material formed thereon (block 788). Also, at the point of sale, a sheet is provided that is made from a second material or has a second material therein or thereon (block 790). In this embodiment, the combination of the first and second materials forms a changeable portion and causes a chemical reaction that causes the changeable portion to become re-inhibiting for the medium after a period of time. At the point of sale, the desired digital content is written on the medium (block 792). Within the point of sale (e.g., a kiosk), the sheet is permanently applied to the written medium so that the first and second materials contact each other (block 794). This initiates a chemical reaction between the first and second materials that will eventually make the medium unreadable after a period of time (e.g., 3, 4, 5, 10, 20 days). Then, the written medium is provided to the customer with the sheet permanently applied thereon (block 796). As a variation on the eighteenth embodiment illustrated in FIG. 21, the sheet may be applied to the medium before the writing of the desired digital content to the medium.

FIG. 22 is a flowchart 798 illustrating a nineteenth embodiment of the present invention. In this embodiment, a writeable optically-readable medium is provided at the point of sale, and the medium has a first material formed thereon (block 788). Also, at the point of sale, a sheet is provided that is made from a second material or has a second material therein or thereon (block 790). In this embodiment, the combination of the first and second materials causes a chemical reaction that causes the first material to become re-inhibiting for the medium after a period of time. At the point of sale, the desired digital content is written on the medium (block 792). Within the point of sale (e.g., a kiosk), the sheet is temporarily applied to the written medium so that the first and second materials contact each other (block 800). At least part of the second material may be applied on at least part of the first material to form a combination of the first and second materials, for example. In another case, the second material may not be transferred onto the medium (i.e., none of the second material remains on the medium after the sheet is removed). In either case, this initiates a chemical reaction for the first material that will eventually make the medium unreadable after a period of time (e.g., 3 days). Then, the written medium is provided to the customer without the sheet applied thereon (block 802). As a variation on the nineteenth embodiment illustrated in FIG. 22, the sheet may be applied to the medium before or during the writing of the desired digital content to the medium.

In the eighteenth and nineteenth embodiments, the first material may be on a read side and/or a non-read side of the medium. Hence, the sheet may be applied to the read side and/or the non-read side accordingly. The combination of the first and second materials may need time to dry before dispensing the medium to the customer. Also, or in alternative, the combination of the first and second materials may need to be cured by some additional process/step, such as (but not limited to): exposing the combination of materials to electromagnetic waves of a certain wavelength or within a range of wavelengths (e.g., ultraviolet light, infrared light, radio waves, microwaves, etc.). The first material and/or the second material may include an adhesive, for example. As another example, an adhesive may be formed by the combination of the first and second materials. For example, a chemical reaction between the first and second materials may form an adhesive, like a two-part epoxy.

FIG. 23 is a flowchart 804 illustrating a twentieth embodiment of the present invention. In the twentieth embodiment, an optically-readable medium having digital content stored thereon is provided to a customer (block 806). The optically-readable medium has a changeable portion adapted to change from a non-read-inhibiting state to a read-inhibiting state over a predetermined period of time. At least part of the changeable portion forms a message. After the predetermined period of time (i.e., after the changeable portion changes), a message is revealed by the changeable portion (i.e., a message becomes visible after the changeable portion changes) (block 808).

There are numerous variations possible for the twentieth embodiment. For example, the medium may be written or manufactured with the digital content thereon at a location remote from the point of sale (e.g., in a factory). As another example, the medium may be writeable and written at the point of sale after receiving a request for a desired digital content from a customer. As yet another example, part of the medium may be pre-written with a first content at a location remote from the point of sale and another part of the medium may be written with a second content at the point of sale based on a request from a customer. As other further examples, the twentieth embodiment may be implemented into or combined with one or more of the other embodiments (e.g., those described herein) of the present invention. With the benefit of this disclosure, one of ordinary skill in the art will realize many possible variations on or implementations of the twentieth embodiment.

Still referring to the twentieth embodiment illustrated by FIG. 23, the message itself may provide an indication to a customer that the customer has won a prize in a contest. Hence, the twentieth embodiment of the present invention may be used to conduct a contest. As another variation, the message may include a code. The customer may have to go to a web site and enter the code to determine whether the customer has won a prize. This may be particularly useful for luring a customer to a website. The customer may need to input the code at into a kiosk (e.g., where the point of sale is a kiosk) to determine if the customer has won a prize, received a free rental, or obtained some other sort of coupon. This may be useful for encouraging repeat business because the customer may be motivated to return to the kiosk again to enter the code. As still another example, the message itself may act as a coupon or an advertisement. The message may include a logo, e.g., for advertising the medium vendor and/or some other organization. The message may include a statement or statements, such as (but not limited to): "thank you," "disc expired," "please recycle," "please rent again with us," "rent again," and combinations thereof, for example.

The changeable portion is preferably substantially transparent in the non-read-inhibiting state so that the message is difficult to see or so that the message is not visible, for example. The changeable portion is preferably colored and non-transparent in the read-inhibiting state. The changeable portion may be substantially non-light-absorbent in the non-read-inhibiting state. Also, the changeable portion may be colored and light-absorbent in the read-inhibiting state. In the read-inhibiting state, the changeable portion may have a property such as being opaque, translucent, colored, cloudy, crazed, light-absorbing, light-scattering, light-distorting, light-diffusing, phase-inverting, and combinations thereof, for example. With the benefit of this disclosure, one of ordinary skill in the art may realize many other variations on the message and/or the appearance and properties of the changeable portion.

FIG. 24 is a flowchart 810 illustrating a twenty-first embodiment of the present invention. As briefly described above, a request from a customer may include an indication of a desired version of the desired digital content (block 812). At the point of sale, the desired version of the desired digital content is written on the medium (block 814). The medium with the desired version of the desired digital content written thereon is then provided to the customer (block 816). The desired version may specify something such as (but not necessarily limited to): full screen video format, wide screen video format, sound output format, language selection, originally released version, digitally remastered version, uncut version, director's cut version, unabridged version, special edition, including-bonus-material version, including-deleted-scenes version, edited-for-television version, subtitle language selection, rated G version, rated PG version, rated PG-13 version, rated R version, unrated version, extended version, revised version, and combinations thereof, for example. Where the desired digital content is a computer game, a computer software, an educational tutorial, web pages, music, music videos, and combinations thereof, for example, the desired version may specify something such as (but not necessarily limited to): a game console selection, a computer operating system selection, compatibility with another software program, an education level, a religious viewpoint, a music recording format, a video display format, and combinations thereof, for example.

FIG. 25 is a flowchart 818 illustrating a twenty-second embodiment of the present invention. In the twenty-second embodiment, a request for a desired digital content is received from a customer (block 702). At a point of sale, a writeable optically-readable medium is provided, and the medium has a changeable portion for making the medium unreadable after a period of time upon activation (block 820). At the point of sale, the desired digital content is written on the medium (block 822). Then, the written medium is provided to the customer (block 824). At some point, an advertisement is displayed to the customer (block 826).

There are many variations on how and where the advertisement may be displayed to the customer. For example, the advertisement may be displayed to the customer at the point of sale. If the point of sale is a kiosk and the customer comes to the kiosk to obtain the written medium, for example, a screen of the kiosk may display the advertisement and/or a screen near or adjacent to the kiosk may display the advertisement. A screen separated from the kiosk is preferably driven by and communicably coupled to a computer system (or some other driving device) within the kiosk.

As another example (see e.g., flowchart 828 in FIG. 26), the advertisement may be digitally written on the medium along with the desired digital content (block 830), and/or the advertisement may be pre-written on the medium before being loaded into the kiosk or before the desired digital content is written. Hence, the advertisement may be read by an optical media reading machine while the customer is using the medium to access the desired digital content. In such case, the advertisement may be displayed to the customer at some point while the customer is using the medium (block 832). For example, the advertisement may be played to the customer on the customer's television before, after, and/or during a program or show (i.e., the desired digital content) that the customer is watch from the medium. The advertisement may play automatically without the customer's prompting and/or the advertisement may be played only when the customer chooses to view it.

The format of the advertisement displayed to the customer may include (but is not necessarily limited to): a still image, text, video, audio, interactive prompts, software, and combinations thereof, for example. The advertisement may be a for variety of different things, such as (but not limited to): a movie, a television show, a television station, a radio station, a music band, a music compilation, an artist, an entertainer, a restaurant, an event, real estate, a real estate agent, a play, a game, a sports team, a food, a drink, a travel agency, a vacation destination, a city, a state, a country, a religious organization, an educational organization, a non-profit organization, an announcement, a product, a service, a web site, and combinations thereof, for example. The advertisement may be for a business having a location within a same city as the point of sale, for example. This would allow local businesses, or businesses with a location near the point of sale, to provide targeted advertising to the customers. Also, the advertising may vary depending on the desired digital content selected. For example, if a customer selects an action movie, the advertising may be targeted toward persons that typically watch action movies. And if a customer selects a kids movie, the advertising may be targeted towards kids, for example.

If an advertisement includes a video, for example, the video may include (but is not necessarily limited to): text, images, web pages, hyperlinked text, audio, music, a movie preview, information about a product, information about a service, information about real estate, information about a business having a location with a same city as the point of sale, information about a vacation destination, educational information, music, a public service announcement, information about a religion, and combinations thereof, for example.

As yet another example for advertising using an embodiment of the present invention, the advertisement may be a still image (or some other poster or sticker, for example) attached to an outside of a kiosk, where the point of sale is a kiosk, for example. With the benefit of this disclosure, one of ordinary skill in the will likely realize many variations on the advertising possibilities of an embodiment of the present invention. Also, the twenty-second embodiment may be combined with one or more of other embodiments of the present invention to form a variation on the twenty-second embodiment.

FIG. 27 is a flowchart 834 illustrating a twenty-third embodiment of the present invention. In the twenty-third embodiment, a request is received from a customer for a desired digital content (block 702) and a request is received from the customer for an edible item (block 836). These requests may be received together or separately in any order. In this embodiment, the point of sale is a restaurant. At the restaurant, a writeable optically-readable medium is provided. The medium has a changeable portion (e.g., as described above for other embodiments) that, when activated, is adapted to physically change over a period of time to a degree that at least part of the medium becomes unreadable (block 838). At the restaurant, the desired digital content is written on the medium (block 840). Then, the written medium is provided to the customer (block 842) and the edible medium is provided to the customer (block 844). These providing steps (blocks 842 and 844) may be performed together or separately at different times, for example.

There are many variations possible for the twenty-third embodiment. For example, the requests for the desired digital content and the edible item may be performed together at the restaurant. Alternatively, just one of the requests (for the desired digital content or for the edible item) may be performed at the restaurant. As another example, the requests for the desired digital content and the edible item may be performed together at a web site. Alternatively, just one of the requests (for the desired digital content or for the edible item) may be performed at the web site. At the restaurant, the machine that receives the requests may be located where only employees have access to it and/or the machine may be located in a lobby area of the restaurant where customers may access it (e.g., a kiosk in the restaurant), for example. Similarly, the machine that produces the written medium may be located where only employees have access to it and/or the machine may be located in a lobby area of the restaurant (e.g., a kiosk in the restaurant), for example. Furthermore, the machine that dispenses the written medium may be located where only employees have access to it and/or the machine may be located in a lobby area of the restaurant, for example. The receiving of the requests, the producing of the written medium, the dispensing of the written medium, or any combination thereof may be performed in a single machine (e.g., a kiosk) or in several machines, which may or may not be at a same geographical location, for example. The written medium and/or the edible item may be provided to the customer at the restaurant or may be delivered to the customer. For example, a customer may go online and order a movie and a pizza from a pizza restaurant, and have both delivered to the customer at the customer's home. In another example, a customer may order a movie online for pick at a selected restaurant that sells tacos, and then the customer may go to the restaurant to pick up the video and, while at the restaurant, order and obtain an edible item (e.g., a taco). As yet another example, a customer may go to a restaurant having a kiosk in the lobby. The customer may submit a request for a movie to the kiosk at the restaurant, then order food from a person at a cash register at the restaurant, obtain and eat the food, and then obtain the written medium from the kiosk after eating the food, for example.

The edible item or items included in a request (see block 836 in FIG. 27) may include (but is not necessarily limited to): beer, soda, juice, water, ice, pizza, hamburger, french fries, rice, noodles, egg roll, soup, salad, taco, burrito, seafood, fish, chicken, beef, pork, processed soy product, dessert, pastry, donuts, cake, vegetable, fruit, and combinations thereof, for example. In other words, the edible item may be anything that a person may desire to eat and/or drink. With the benefit of this disclosure, one of ordinary skill in the will realize many other variations and applications of the twenty-third embodiment.

Any of the embodiments disclosed herein may be combined to form other embodiments of the present invention that fall within the scope of the appended claims. With the benefit of this disclosure, one of ordinary skill in the art may realize many other embodiments of the present invention.

It will be appreciated by those skilled in the art having the benefit of this disclosure that embodiments of the present invention provide methods of temporarily providing digital content to a customer on an optically-readable medium. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A method of temporarily providing digital content to a customer, comprising:
    receiving a request from the customer, the request including an indication of a desired digital content;
    at a point of sale, providing a writeable optically-readable medium having a removable protective cover operably installed thereon,
        wherein the medium comprises a changeable portion that, when activated, is adapted to physically change over a period of time to a degree that at least part of the medium becomes unreadable by an optical media reading machine, and
        wherein the protective cover is adapted to inhibit activation of the changeable portion of the medium when operably installed;
    at the point of sale, writing the desired digital content on the medium;
    at the point of sale, removing the protective cover to activate the changeable portion; and
    providing the written medium to the customer without the protective cover.

2. The method of claim 1, wherein the protective cover is a layer, and wherein a majority of the layer has a substantially uniform thickness.

3. The method of claim 1, wherein the protective cover remains operably installed during the writing.

4. The method of claim 1, wherein the removing of the protective layer occurs before the writing.

5. The method of claim 1, wherein the request further includes a location choice for the point of sale.

6. The method of claim 1, wherein the protective layer is removed as the written medium is being provided to the customer.

7. The method of claim 1, wherein the protective layer is removed before the written medium is provided to the customer.

8. The method of claim 1, further comprising:
    receiving an indication that the customer is ready for the written medium to be dispensed,
    wherein the protective layer is removed from the written medium after the receipt of the indication that the customer is ready.

9. The method of claim 1, wherein the digital content is selected from a group consisting of video, audio, text, images, web pages, hyperlinked text, a movie, a music video, an interactive video, a game, a television show, a television series, a cartoon, computer software, a still advertisement, an advertisement banner, a commercial, a movie preview, a public service announcement, an educational film, a document, sales information, and combinations thereof.

10. The method of claim 1, wherein the protective cover completely encloses the medium.

11. The method of claim 1, wherein the protective cover covers at least part of the medium.

12. The method of claim 1, wherein the point of sale is a kiosk.

13. The method of claim 1, wherein the point of sale is at a location selected from a group consisting of an unmanned-stand-alone building, a convenience store, a restaurant, a video rental store, a gas station, a grocery store, a pizza delivery shop, a shopping mall, a shopping center, a booth, a parking lot, an apartment building, a laundry facility, a dormitory, a school campus, a library, a book store, a music store, a metro station, a bus station, an airport, a hotel, an exercise facility, a fitness club, an arena, a convention center, and combinations thereof.

14. The method of claim 1, wherein the providing of the written medium to the customer is performed at the point of sale by dispensing the written medium to the customer.

15. The method of claim 1, wherein the providing of the written medium to the customer is performed by delivering the written medium to the customer.

16. A method of temporarily providing digital content to a customer, comprising:
    receiving a request from the customer, the request including an indication of a desired digital content;
    at a point of sale, providing a writeable optically-readable medium having a removable protective cover operably installed thereon,
        wherein the medium comprises a changeable portion that, when activated, is adapted to physically change over a period of time to a degree that at least part of the medium becomes unreadable by an optical media reading machine, and
        wherein the protective cover is adapted to inhibit activation of the changeable portion of the medium when operably installed;
    at the point of sale, removing the protective cover to activate the changeable portion;
    at the point of sale and after removing the protective cover, writing the desired digital content on the medium; and
    providing the written medium to the customer without the protective cover.

17. The method of claim 16, wherein the request further includes a location choice for the point of sale.

18. The method of claim 16, wherein the digital content is selected from a group consisting of video, audio, text, images, web pages, hyperlinked text, a movie, a music video, an interactive video, a game, a television show, a television series, a cartoon, computer software, a still advertisement, an advertisement banner, a commercial, a movie preview, a public service announcement, an educational film, a document, sales information, and combinations thereof.

19. The method of claim 16, wherein the point of sale is a kiosk.

20. The method of claim 16, wherein the point of sale is at a location selected from a group consisting of an unmanned-stand-alone building, a convenience store, a restaurant, a video rental store, a gas station, a grocery store, a pizza delivery shop, a shopping mall, a shopping center, a booth, a parking lot, an apartment building, a laundry facility, a dormitory, a school campus, a library, a book store, a music store, a metro station, a bus station, an airport, a hotel, an exercise facility, a fitness club, an arena, a convention center, and combinations thereof.

21. The method of claim 16, wherein the providing of the written medium to the customer is performed at the point of sale by dispensing the written medium to the customer.

22. The method of claim 16, wherein the providing of the written medium to the customer is performed by delivering the written medium to the customer.

23. A method of temporarily providing digital content to a customer, comprising:
- receiving a request from the customer, the request including an indication of a desired digital content;
- at a point of sale, providing a writeable optically-readable medium having a removable protective cover operably installed thereon,
  - wherein the medium comprises a first changeable portion that, when activated, is adapted to physically change over a period of time to a degree that at least part of the medium becomes unreadable by an optical media reading machine, and
  - wherein the protective cover is adapted to inhibit activation of the first changeable portion of the medium when operably installed and wherein the protective cover includes a second changeable portion that, when activated, is adapted to physically change over a period of time to a degree that at least part of the medium is unreadable through the protective cover by an optical media reading machine;
- at the point of sale, writing the desired digital content on the medium and through the protective cover while the protective cover is operably installed on the medium;
- activating the second changeable portion of the protective cover such that at least part of the protective cover must be removed before subsequently reading the medium with an optical media reading machine; and
- providing the written medium to the customer with the protective cover operably installed on the medium.

24. The method of claim 23, further comprising:
- at the point of sale, providing the writeable optically-readable medium having a protective package operably installed, wherein the protective package is adapted to inhibit activation of the second changeable portion of the protective cover when operably installed; and
- at the point of sale, removing the protective package before the writing.

25. The method of claim 23, wherein the second changeable portion is activated during the writing by a laser used for the writing.

26. The method of claim 23, wherein the protective cover is a layer, and wherein a majority of the layer has a substantially uniform thickness.

27. The method of claim 23, wherein the request further includes a location choice for the point of sale.

28. The method of claim 23, wherein the point of sale is a kiosk.

29. The method of claim 23, wherein the point of sale is at a location selected from a group consisting of an unmanned-stand-alone building, a convenience store, a restaurant, a video rental store, a gas station, a grocery store, a pizza delivery shop, a shopping mall, a shopping center, a booth, a parking lot, an apartment building, a laundry facility, a dormitory, a school campus, a library, a book store, a music store, a metro station, a bus station, an airport, a hotel, an exercise facility, a fitness club, an arena, a convention center, and combinations thereof.

30. The method of claim 23, wherein the providing of the written medium to the customer is performed at the point of sale by dispensing the written medium to the customer.

31. The method of claim 23, wherein the providing of the written medium to the customer is performed by delivering the written medium to the customer.

32. A method of temporarily providing digital content to a customer, comprising:
- receiving a request from the customer, the request including an indication of a desired digital content;
- at a point of sale, providing a writeable optically-readable medium having a protective package operably installed thereon,
  - wherein the medium comprises a changeable portion that, when activated, is adapted to physically change over a period of time to a degree that at least part of the medium becomes unreadable by an optical media reading machine, and
  - wherein the protective package is adapted to inhibit activation of the changeable portion of the medium when operably installed;
- at the point of sale, writing the desired digital content on the medium with the protective package operably installed thereon; and
- providing the written medium to the customer with the protective package operably installed thereon.

33. The method of claim 32, wherein the writing of the desired digital content is performed by a specialized machine adapted to retain the medium and write to the medium while the protective package is still operably installed, and
- wherein the protective package, when operably installed, obstructs normal use of the medium in a common optical media reading machine such that the protective package must be at least partially removed before the customer may read the medium with a common optical media reading machine.

34. The method of claim 32, wherein the request further includes a location choice for the point of sale.

35. The method of claim 32, wherein the point of sale is a kiosk.

36. The method of claim 32, wherein the point of sale is at a location selected from a group consisting of an unmanned-stand-alone building, a convenience store, a restaurant, a video rental store, a gas station, a grocery store, a pizza delivery shop, a shopping mall, a shopping center, a booth, a parking lot, an apartment building, a laundry facility, a dormitory, a school campus, a library, a book store, a music store, a metro station, a bus station, an airport, a hotel, an exercise facility, a fitness club, an arena, a convention center, and combinations thereof.

37. The method of claim 32, wherein the providing of the written medium to the customer is performed at the point of sale by dispensing the written medium to the customer.

38. The method of claim 32, wherein the providing of the written medium to the customer is performed by delivering the written medium to the customer.

39. A method of temporarily providing digital content to a customer, comprising:
- receiving a request from the customer, the request including an indication of a desired digital content;
- at a point of sale, providing a writeable optically-readable medium having a first removable protective cover operably installed thereon,
  - wherein the medium comprises a changeable portion that, when activated, is adapted to physically change over a period of time to a degree that at least part of the medium becomes unreadable by an optical media reading machine, and wherein the first protective cover is adapted to inhibit activation of the changeable portion of the medium when operably installed;

at the point of sale, removing the first protective cover from the medium;

at the point of sale and with the first protective cover removed, writing the desired digital content on the medium;

at the point of sale and after the writing, operably installing a second removable protective cover on the written medium, wherein the second protective cover is adapted to inhibit activation of the changeable portion of the medium when operably installed; and providing the written medium to the customer with the second protective cover operably installed thereon.

40. The method of claim 39, wherein the removing of the first protective cover, the writing, and the operably installing the second protective cover are performed in a controlled environment.

41. The method of claim 40, wherein the controlled environment is selected from a group consisting of a vacuum chamber, a low pressure chamber, a chamber lacking humidity, a chamber including an inert gas, a chamber lacking an ingredient or gas that would activate the changeable portion, and combinations thereof.

42. The method of claim 39, wherein the first protective cover covers only a portion of the medium.

43. The method of claim 39, wherein the first protective cover entirely encloses the medium therein.

44. The method of claim 39, wherein the second protective cover covers only a portion of the medium.

45. The method of claim 39, wherein the second protective cover entirely encloses the medium therein.

46. The method of claim 39, wherein the second protective cover is the first protective cover.

47. The method of claim 39, wherein the providing of the written medium to the customer is performed at the point of sale by dispensing the written medium to the customer.

48. The method of claim 39, wherein the providing of the written medium to the customer is performed by delivering the written medium to the customer.

49. A method of temporarily providing digital content to a customer, comprising:

receiving a request from the customer, the request including an indication of a desired digital content;

at a point of sale, providing a writeable optically-readable medium;

at the point of sale, providing a sheet, wherein the sheet is separate from the medium and wherein the sheet comprises a changeable portion that, when activated, is adapted to physically change over a period of time;

at the point of sale, writing the desired digital content on the medium;

at the point of sale, permanently applying the sheet to the medium;

activating the changeable portion of the sheet so that after the period of time the changeable portion of the sheet is physically changed to a degree that at least part of the medium becomes unreadable through the sheet by an optical media reading machine; and providing the written medium to the customer.

50. The method of claim 49, wherein the activating of the changeable portion is performed before the writing of the desired digital content on the medium and before the applying of the sheet to the medium.

51. The method of claim 50, wherein the writing of the desired digital content on the medium is performed before the applying of the sheet to the medium.

52. The method of claim 50, wherein the applying of the sheet to the medium is performed before the writing of the desired digital content on the medium.

53. The method of claim 49, wherein the writing of the desired digital content on the medium is performed before the activating of the changeable portion and before the applying of the sheet to the medium.

54. The method of claim 53, wherein the applying of the sheet to the medium is performed before the activating of the changeable portion.

55. The method of claim 53, wherein the applying of the sheet to the medium is performed after the activating of the changeable portion.

56. The method of claim 49, wherein the applying of the sheet to the medium is performed before the writing of the desired digital content on the medium and before the activating of the changeable portion.

57. The method of claim 56, wherein the writing of the desired digital content on the medium is performed after the activating of the changeable portion.

58. The method of claim 56, wherein the activating of the changeable portion is performed during the writing of the desired digital content on the medium.

59. The method of claim 56, wherein the writing of the desired digital content on the medium is performed before the activating of the changeable portion.

60. The method of claim 59, wherein the activating of the changeable portion occurs at the point of sale.

61. The method of claim 59, wherein the activating of the changeable portion is initiated by a read laser when the customer uses the medium.

62. A method of temporarily providing digital content to a customer, comprising:

receiving a request from the customer, the request including an indication of a desired digital content;

at a point of sale, providing a writeable optically-readable medium;

at the point of sale, providing a sheet, wherein the sheet is separate from the medium and wherein the sheet comprises a changeable portion that, when activated, is adapted to physically change over a period of time, and a removable protective cover operably installed thereon, the protective cover being adapted to inhibit activation of the changeable portion when operably installed;

at the point of sale, writing the desired digital content on the medium;

at the point of sale, removing the protective cover from the sheet to activate the changeable portion;

at the point of sale, permanently applying the sheet to the written medium, wherein after the period of time the changeable portion of the sheet is physically changed to a degree that at least part of the medium becomes unreadable through the sheet by an optical media reading machine; and providing the written medium to the customer.

63. A method of temporarily providing digital content to a customer, comprising:

receiving a request from the customer, the request including an indication of a desired digital content;

at a point of sale, providing a writeable optically-readable medium, the medium having a first material formed on a read-side surface thereof;

at the point of sale, writing the desired digital content on the medium;

at the point of sale, providing a sheet, wherein the sheet is separate from the medium and wherein the sheet comprises a second material;

at the point of sale, permanently applying the sheet to the read-side of the written medium, such that at least part of the first material is in contact with at least part of the second material, wherein the first and second materials react with each other and after a period of time at least part of the medium becomes unreadable by an optical media reading machine through an area where the first and second materials are in contact; and providing the written medium to the customer.

64. The method of claim 63, wherein the sheet is made from the second material.

65. The method of claim 63, wherein the sheet has the second material formed thereon.

66. The method of claim 63, wherein the sheet is initially covered at least partially by a protective cover, and the method further comprising:

at the point of sale and before the permanently applying, removing the protective cover from the sheet.

67. The method of claim 63, wherein the first material comprises an adhesive.

68. The method of claim 63, wherein the second material comprises an adhesive.

69. The method of claim 63, wherein an adhesive is formed when the first material reacts with the second material.

70. The method of claim 63, wherein the providing of the written medium to the customer is performed at the point of sale by dispensing the written medium to the customer.

71. The method of claim 63, wherein the providing of the written medium to the customer is performed by delivering the written medium to the customer.

72. A method of temporarily providing digital content to a customer, comprising:

receiving a request from the customer, the request including an indication of a desired digital content;

at a point of sale, providing a writeable optically-readable medium, the medium having a first material formed thereon;

at the point of sale, writing the desired digital content on the medium;

at the point of sale, providing a sheet, wherein the sheet is separate from the medium and wherein the sheet comprises a second material;

at the point of sale, temporarily applying the sheet to the written medium, such that at least part of the first material is in contact with at least part of the second material, wherein the first and second materials react with each other so that after a period of time at least part of the medium becomes unreadable by an optical media reading machine;

at the point of sale, removing the sheet from the medium; and providing the written medium to the customer.

73. The method of claim 72, wherein the first material is located on a read side of the medium.

74. The method of claim 72, wherein the first material is located on a non-read side of the medium, and wherein the sheet is temporarily applied to the non-read side of the medium.

75. The method of claim 72, further comprising:
allowing the combination of first and second materials to dry on the medium before the dispensing to the customer.

76. The method of claim 72, further comprising:
curing the combination of the first and second materials before the dispensing to the customer.

77. The method of claim 76, wherein the curing comprises exposing the combination of the first and second materials to electromagnetic waves selected from a group consisting of ultraviolet light, infrared light, radio waves, microwaves, and combinations thereof.

78. The method of claim 72, wherein the providing of the written medium to the customer is performed at the point of sale by dispensing the written medium to the customer.

79. The method of claim 72, wherein the providing of the written medium to the customer is performed by delivering the written medium to the customer.

80. A method of temporarily providing digital content to a customer, comprising:

receiving a request from the customer comprising an indication of a desired digital content and an indication of a desired version of the desired digital content;

at a point of sale, providing a writeable optically-readable medium, wherein the medium comprises a changeable portion that, when activated, is adapted to physically change over a period of time to a degree that at least part of the medium becomes unreadable by an optical media reading machine;

at the point of sale, writing the desired version of the desired digital content on the medium; and providing the medium with the desired version of the desired digital content written thereon to the customer.

81. The method of claim 80, wherein the desired version specifies something selected from a group consisting of full screen video format, wide screen video format, sound output format, language selection, originally released version, digitally remastered version, uncut version, director's cut version, unabridged version, special edition, including-bonus-material version, including-deleted-scenes version, edited-for-television version, subtitle language selection, rated G version, rated PG version, rated PG-13 version, rated R version, unrated version, extended version, revised version, and combinations thereof.

82. The method of claim 80, wherein the desired digital content is selected from a group consisting of a computer game, a computer software, an educational tutorial, web pages, music, music videos, and combinations thereof, and wherein the desired version specifies something selected from a group consisting of a game console selection, a computer operating system selection, compatibility with another software program, an education level, a religious viewpoint, a music recording format, a video display format, and combinations thereof.

83. The method of claim 80, wherein the providing the medium with the desired version of the desired digital content written thereon to the customer is performed at the point of sale by dispensing the medium to the customer.

84. The method of claim 80, wherein the providing the medium with the desired version of the desired digital content written thereon to the customer is performed by delivering the medium to the customer.

85. A method of temporarily providing digital content to a customer, comprising:

receiving a request from the customer comprising an indication of a desired digital content and a first location choice for a point of sale;

estimating a wait time required to fulfill the request at the first location choice;

informing the customer about the estimated wait time at the first location choice;

asking the customer if the estimated wait time at the first location choice is acceptable;

if the customer indicates that the estimated wait time at the first location choice is not acceptable,
  estimating a wait time required to fulfill the request at an alternative location for the point of sale, and
  if the estimated wait time at the alternative location is less than the estimated wait time at the first location choice, informing the customer about the estimated wait time at the alternative location and if the customer still desires that the request be fulfilled, obtaining a current location choice for the point of sale;

if the customer indicates that the estimated wait time at the first location choice is acceptable, making the first location choice the current location choice for the point of sale;

at the point of sale of the current location choice, providing a writeable optically-readable medium, wherein the medium comprises a changeable portion that, when activated, is adapted to physically change over a period of time to a degree that at least part of the medium becomes unreadable by an optical media reading machine;

at the point of sale of the current location choice, writing the desired digital content on the medium; and at the point of sale of the current location choice, providing the medium with the desired digital content written thereon to the customer.

* * * * *